US012676037B2

(12) United States Patent
Murata

(10) Patent No.: US 12,676,037 B2
(45) Date of Patent: *Jul. 7, 2026

(54) GATE SYSTEM, GATE APPARATUS, CONTROL METHOD THEREFOR, AND PROGRAM

(71) Applicant: NEC Corporation, Tokyo (JP)

(72) Inventor: Kazuhito Murata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 18/780,803

(22) Filed: Jul. 23, 2024

(65) Prior Publication Data

US 2025/0014404 A1     Jan. 9, 2025

Related U.S. Application Data

(63) Continuation of application No. 17/618,675, filed as application No. PCT/JP2020/004497 on Feb. 6, 2020, now Pat. No. 12,165,449.

(51) Int. Cl.
G07C 9/00         (2020.01)
G06T 7/70         (2017.01)
               (Continued)

(52) U.S. Cl.
CPC ............ G07C 9/00563 (2013.01); G06T 7/70 (2017.01); G06V 40/161 (2022.01);
               (Continued)

(58) Field of Classification Search
CPC ........ G07C 9/00563; G07C 9/37; G07C 9/10;

G06T 7/70; G06T 7/00; G06T 7/246;
G06T 7/254; G06T 7/77; G06T 7/20;
G06T 7/207; G06T 7/215; G06T 7/223;
G06T 7/262; G06T 7/269; G06T 7/277;
G06T 7/285; G06T 7/292; G06T 7/11;
G06T 7/174;
               (Continued)

(56) References Cited

U.S. PATENT DOCUMENTS 6,756,910 B2     6/2004  Ohba et al.
10,521,991 B1 *  12/2019 Cameron ........... G07C 9/00174
               (Continued)

FOREIGN PATENT DOCUMENTS

CN          109726656 A     5/2019
DE          60207128 T3     1/2010   ............. E05F 15/43
               (Continued)

OTHER PUBLICATIONS

International Search Report for PCT Application No. PCT/JP2020/004497, mailed on Apr. 7, 2020.
               (Continued)

*Primary Examiner* — Brian A Zimmerman
*Assistant Examiner* — Anthony D Afrifa-Kyei
(74) *Attorney, Agent, or Firm* — Sughrue Mion, PLLC

(57)          ABSTRACT

A gate apparatus (10) includes an imaging unit (102) that images a person passing through a passage leading to a gate, an acquisition unit (104) that acquires a detection result from a detection unit which is provided on a floor of the passage, and a control unit (106) that controls, by using the detection result acquired by the acquisition unit (104), imaging timing of an imaging unit (102).

5 Claims, 21 Drawing Sheets

(51) Int. Cl.
    *G06V 40/16*       (2022.01)
    *G07C 9/10*       (2020.01)
    *G07C 9/37*       (2020.01)
(52) U.S. Cl.
    CPC ............. *G06V 40/172* (2022.01); *G07C 9/10*
           (2020.01); *G07C 9/37* (2020.01)
(58) Field of Classification Search
    CPC .......... G06T 7/194; G06T 2207/10016; G06T
           2207/20224; G06T 2207/30196; G06T
           2207/30232; G06V 40/172; G06V
           40/161; G06V 20/53; G07B 15/00; H04N
           7/18; G06Q 10/1091
    See application file for complete search history.

(56) References Cited

U.S. PATENT DOCUMENTS

| | | | | |
|---|---|---|---|---|
| 12,165,449 | B2 * | 12/2024 | Murata .................... | G07C 9/10 |
| 2015/0317853 | A1 | 11/2015 | Reymann et al. | |
| 2019/0206135 | A1 | 7/2019 | Jiang ....................... | G06F 3/017 |

FOREIGN PATENT DOCUMENTS

| | | | | |
|---|---|---|---|---|
| JP | 2001-266153 | A | 9/2001 | |
| JP | 2002-288670 | A | 10/2002 | |
| JP | 2003-271084 | A | 9/2003 | |
| JP | 2004-151978 | A | 5/2004 | |
| JP | 2006-163788 | A | 6/2006 | |
| JP | 2008-071172 | A | 3/2008 | |
| JP | 2008-123186 | A | 5/2008 | |
| JP | 2011-064841 | A | 3/2011 | |
| JP | 2015-111321 | A | 6/2015 | |
| JP | 2020080127 | A | 5/2020 | |
| JP | 7075702 | B2 | 5/2022 | |
| WO | 2009/016846 | A1 | 2/2009 | |
| WO | WO-2012052808 | A1 * | 4/2012 | ............. G07C 9/257 |

OTHER PUBLICATIONS

Extended European Search Report for EP Application No. EP20917642.9 dated on Feb. 17, 2023.
SG Office Action for SG Application No. 11202251577G, mailed on Aug. 4, 2025.

* cited by examiner

Figure 14:
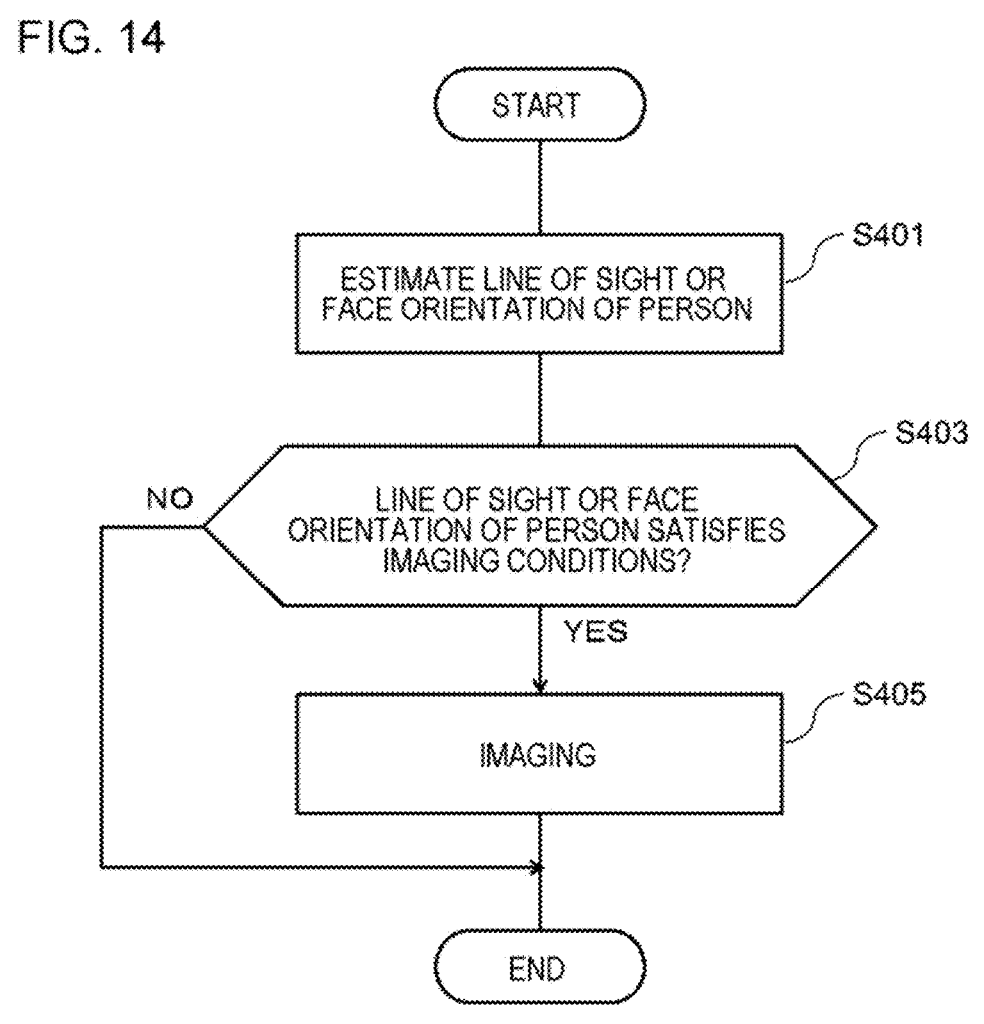

START

ESTIMATE LINE OF SIGHT OR
FACE ORIENTATION OF PERSON — S401

LINE OF SIGHT OR FACE
ORIENTATION OF PERSON SATISFIES
IMAGING CONDITIONS? — S403

NO

YES

IMAGING — S405

END

GATE SYSTEM, GATE APPARATUS, CONTROL METHOD THEREFOR, AND PROGRAM

This application is a continuation of U.S. application Ser. No. 17/618,675 filed on Dec. 13, 2021, which is a National Stage Entry of PCT/JP2020/004497 filed on Feb. 6, 2020, the contents of all of which are incorporated herein by reference, in their entirety.

TECHNICAL FIELD

The some non-limiting embodiments relate to a gate system, a gate apparatus, a control method therefor, and a program.

BACKGROUND ART

With advancement of an image recognition technique, in recent years, an authentication apparatus using a face image of a person entering or exiting from a facility or the like that requires security management has been increasingly in practical use, and various techniques for improving the recognition accuracy of such an apparatus have been proposed.

For example, Patent Document 1 describes a person recognition apparatus that recognizes a face image of a person in security management. In order to solve a problem causing a decrease in a recognition rate due to a change in a standing position or a posture of a recognition target person, the person recognition apparatus displays, on a display unit, a moving image of a face of a recognition target person being imaged, a guide line that guides the recognition target person to stand naturally in the center of a field of view of a camera, as well as a guide, provided inside the guide line, that indicates an actually detected face position and size.

Further, in a face image recognition apparatus according to Patent Document 2, a recognition target person stops at a position related to his/her height on a floor with a height difference, a camera captures and inputs a face image of the recognition target person, and a monitor projects thereon the face image of the recognition target person input by the camera in such a way that the recognition target person can make a fine adjustment of his/her position while checking his/her own face image on the monitor. Thus, it is possible to acquire a face image of a recognition target person irrespective of his/her height, and acquire a face image of the recognition target person in a state that the person stands still.

RELATED DOCUMENT

Patent Document

[Patent Document 1] Japanese Patent Application Publication No. 2004-151978

[Patent Document 2] Japanese Patent Application Publication No. 2001-266153

SUMMARY

Technical Problem

According to techniques described in the foregoing literatures, a recognition target person is guided to come to a standstill and an image of a face of the person is displayed on a monitor when the face image of the recognition target person is acquired. However, in a situation where a large number of people use a face image recognition apparatus, such as when people are passing through customs or entering a boarding gate in an airport or the like, it is unfavorable to guide each person to stop for face authentication due to time-consuming and an increase of congestion. To address this problem, a gate is provided in a place requiring a check, and face authentication using a face image acquired by imaging a face of a person moving in front of the gate is performed.

When such a gate for performing identity authentication such as face authentication is introduced, since an existing facility may have only a limited space for a place of installing a gate, it may be difficult to provide a long passage to guide a target person for authentication to walk through. In such a case, contrivance is necessary that prevents a decrease in authentication accuracy even when an image of an authentication target person is used, which image is acquired as the person is walking through a short passage.

An object of the some non-limiting embodiments is to improve an authentication accuracy in a case where a camera installed in a place requiring identity verification images an image suitable for identity authentication.

Solution to Problem

Each of aspects of the some non-limiting embodiments adopt each of the following configurations to solve the above described problem.

A first aspect relates to a gate apparatus.

A first gate apparatus according to the first aspect includes:

an imaging unit that images a person passing through a passage leading to a gate;

an acquisition unit that acquires a detection result from a detection unit which is provided on a floor of the passage and detects presence of the person; and a control unit that controls imaging timing of the imaging unit by using a detection result acquired by the acquisition unit.

A second gate apparatus according to the first aspect includes:

an imaging unit that images a verification target person in a place requiring identity verification;

an acquisition unit that acquires a detection result from a detection unit which is provided at a stepping position for a person in the place requiring identity verification and detects presence of the person; and a control unit that controls imaging timing of the imaging unit by using the detection result acquired by the acquisition unit.

A third gate apparatus according to the first aspect includes:

a first acquisition unit that acquires, from an imaging unit, an image in which a person passing through a passage leading to a gate is imaged;

a second acquisition unit that acquires a detection result from a detection unit which is provided on a floor of the passage and detects presence of the person; and a control unit that controls imaging timing of the imaging unit by using the detection result acquired by the second acquisition unit.

A second aspect relates to a control method for a gate apparatus executed by at least one computer.

A first control method for a gate apparatus according to the second aspect includes:

by a gate apparatus, 3                                                                    4 detecting presence of a person by using a sensor which is provided on a floor of a passage leading to a gate; and controlling, based on a result of detection, imaging timing of a camera that images the person passing through the passage, in order to acquire a face image used for face authentication.

A second control method for a gate apparatus according to the second aspect includes:

by a gate apparatus, acquiring a detection result from a sensor which is provided at a stepping position for a person in a place requiring identity verification and detects presence of the person in the place requiring identity verification; and controlling, based on the detection result, imaging timing of a camera that images a person as a verification target in the place requiring identity verification in order to acquire a face image used for face authentication.

A third control method for a gate apparatus according to the second aspect includes:

by a gate apparatus, acquiring a detection result from a detection unit which is provided on a floor of a passage and detects presence of a person passing through the passage leading to a gate;

controlling, by using the acquired detection result, imaging timing of an imaging unit for imaging a person passing through a passage leading to a gate; and acquiring an image in which the person is imaged with the imaging timing from the imaging unit.

A third aspect relates to a gate system.

A first gate system according to the third aspect includes:

a gate apparatus; and a foot mark provided on a passage, wherein the gate apparatus includes an imaging unit that images a person passing through the passage leading to a gate, a detection unit that detects presence of the person by using the foot mark provided at a stepping position for a person, the person passing through the passage, and a control unit that controls, by using a detection result of the detection unit, imaging timing of the imaging unit for imaging the person passing through the passage.

A second gate system according to the third aspect includes:

a gate apparatus; and a foot mark that detects presence of a person and is provided in a place requiring identity verification, wherein the gate apparatus includes an imaging unit that images a person as a verification target in the place requiring identity verification, an acquisition unit that acquires a detection result from a detection unit which is provided at a stepping position for a person in the place requiring identity verification and detects detecting presence of the person, and a control unit that controls imaging timing of the imaging unit by using the detection result acquired by the acquisition unit.

Note that, another aspect of the some non-limiting embodiments may be a program that causes at least one computer to execute a method according to the second aspect, or a computer-readable storage medium that stores such a program. The storage medium includes a tangible non-transitory medium.

The computer program includes a computer programming code that causes, when executed by a computer, the computer to execute a control method for a gate apparatus thereon.

Note that, any combination of the above components or any conversion of an expression of the some non-limiting embodiments among, a method, an apparatus, a system, a storage medium, or a computer program is effective as an aspect of the some non-limiting embodiments.

Further, various components of the some non-limiting embodiments need not necessarily be individually independent from each other, a fact that a plurality of components is formed into a single member, a single component is formed of a plurality of members, a certain component is a part of another component, a part of a component overlaps a part of another component, or the like is applicable.

While a method or a computer program according to the some non-limiting embodiments describes a plurality of steps in order, the order of description is not intended to limit the order of executing a plurality of steps. As a result, when a method or a computer program according to the some non-limiting embodiments is executed, the order of the plurality of steps may be changed within a range that will not disrupt the operation of the steps.

Further, a plurality of steps of a method or a computer program according to the some non-limiting embodiments need not necessarily be executed with an individually different timing from each other. For example, execution of a step may allow another step to occur during the same, or an execution timing of a step may overlap a part or a whole of an execution timing of another step.

Advantageous Effects

According to the some non-limiting embodiments, a camera installed in a place requiring identity verification can image an image suitable for identity authentication and authentication accuracy can be improved.

BRIEF DESCRIPTION OF THE DRAWINGS

The abovementioned purpose, and other purposes, characteristics and advantages will be further clarified by the following suitable example embodiments and the following associated drawings.

FIG. 5 is a block diagram illustrating a hardware configuration of a computer that achieves a gate apparatus.

FIG. 12 is a top view of a gate apparatus illustrating another example of a guide pattern.

FIG. 13 illustrates a functional configuration example of the gate apparatus according to the present example embodiment.

FIG. 14 is a flowchart illustrating an operation example of the gate apparatus according to the present example embodiment.

DESCRIPTION OF EMBODIMENTS

Example embodiments will be described below with reference to drawings. Note that a similar sign is given to a similar component in all drawings and overlapping description is omitted as appropriate.

In the example embodiments, the term "acquisition" includes at least one of the operations of an own apparatus: fetching data or information stored in another apparatus or a storage medium (positive acquisition) and inputting data or information output from another apparatus or a storage medium (passive acquisition). An example of positive acquisition is issuing a request or an inquiry to another apparatus and receiving the response, or accessing another apparatus or a storage medium to read out data. An example of passive acquisition is receiving information broadcasted (or transmitted/notified via push notice). Further, the term "acquisition" may refer to selectively acquiring a piece of data or information from received data or information, or selectively receiving broadcasted data or information.

First Example Embodiment

Figure 1:
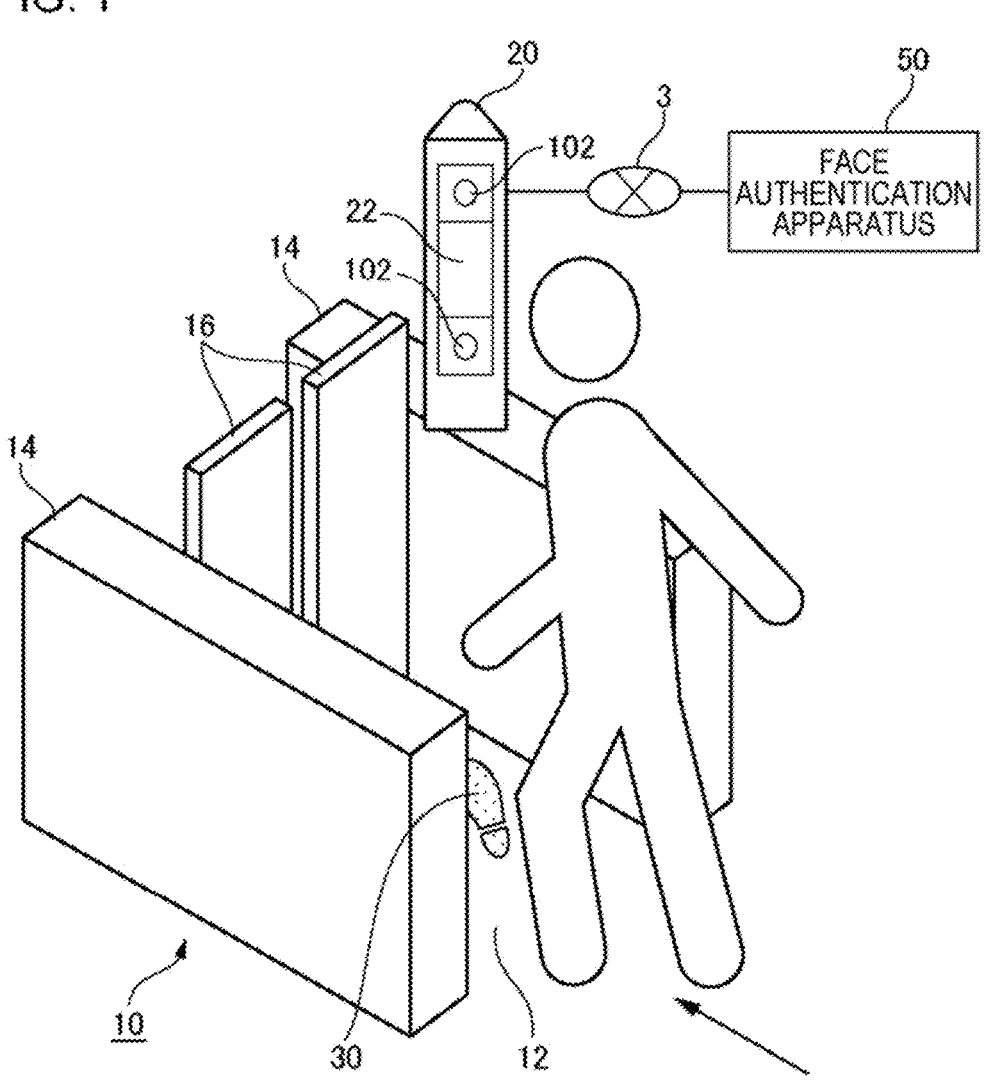
FIG. 1 illustrates a conceptual configuration example of a gate system according to an example embodiment.

<System Configuration>
FIG. 1 illustrates a conceptual configuration example of a gate system 1 according to an example embodiment.

The gate system 1 includes a gate apparatus 10, a guide pattern 30, and a face authentication apparatus 50. The gate apparatus 10 includes a housing 14 and a camera unit 20. The camera unit 20 includes an imaging unit 102 and a display unit 22.

The face authentication apparatus 50 is connected to the gate apparatus 10 via a communication network 3. The face authentication apparatus 50 checks a pre-registered feature value of, for example, a face image of a person against a feature value extracted from a face image or the like of the person acquired by an imaging unit 102 of the gate apparatus 10, thereby performing authentication processing of the person.

While the face authentication apparatus 50 performs authentication processing of a person by using a face image of the person in the present example embodiment, another authentication apparatus using other biometric authentication information may be used to perform authentication processing. The other biometric authentication information includes any one of the feature values of, for example, an iris, a vein, an auricle, a fingerprint, a gait and a body build (a height, a shoulder width, a stature or a skeleton). This authentication apparatus extracts a feature value of biometric authentication information from an imaged image of a person and performs authentication.

The gate apparatus 10 of the gate system 1 according to the present example embodiment is installed, for example, at a boarding gate of an airport. Alternatively, the gate apparatus 10 may be installed at an entrance/exit of a room that controls an entering or exiting person. Or, the gate apparatus 10 may be installed, at a store or the like, as a settlement terminal gate working in combination with a settlement terminal performing cashless settlement. Or, the gate apparatus 10 may be installed as an entrance/exit gate of an unattended store without staff on duty. In this way, the gate apparatus of the gate system 1 according to the present example embodiment is installed in a place requiring identity verification (check point).

Figure 2:
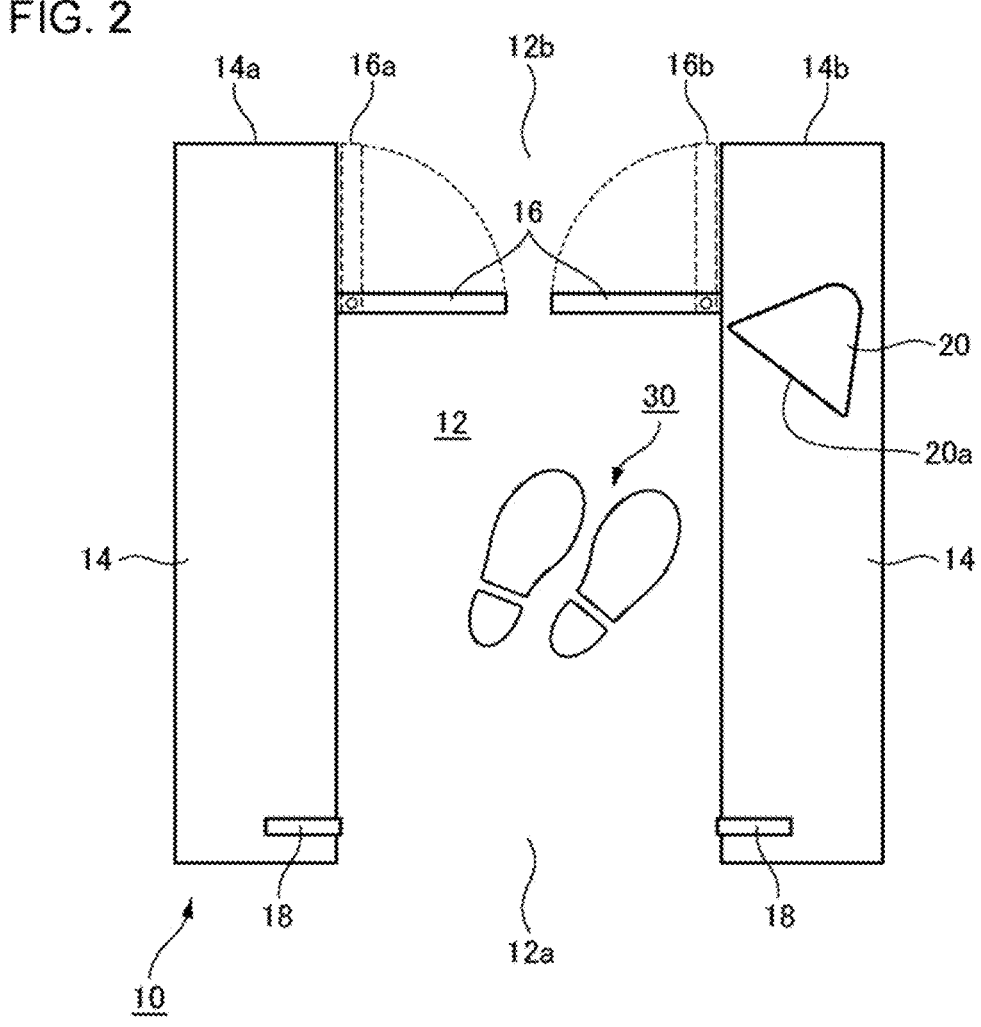
FIG. 2 is a plan view of a gate system as viewed from above.

FIG. 2 is a plan view of the gate system 1 as viewed from above. A housing 14 has a predetermined height and extends over a predetermined distance along a passage 12 a person passes through. On both sides of the passage 12 are installed, side by side, two housings 14, one on each side, at a predetermined distance from each other, along the passage 12. The two housings 14 are preferably installed in parallel to each other.

An entrance 12a of the passage 12 is open. At the exit 12b of the passage 12 is openably and closably provided an open/close flap door 16. In the example of this figure, two open/close flap doors 16 are provided, each rotatably installed at one end of the housing 14. In another example, one open/close flap door 16 may be rotatably installed at one end of either one housing 14. In this example, the open/close flap doors 16 are installed so as to align end surfaces 14a and 14b of the housing 14 at an exit 12b, or inward from end surfaces 14a and 14b in such a way that end surfaces 16a and 16b of the open/close flap doors 16 will not project from end surfaces 14a and 14b of the housing 14 at an exit when the open/close flap doors 16 open.

Open/Close control of the open/close flap door 16 is performed, for example, depending on an authentication result of the face authentication apparatus 50. The open/close flap door 16 may be normally in an open position or normally in a closed position. When the closed position is a normal position, open/close control of the open/close flap door 16 does not take place upon successful face authentication of a person by the face authentication apparatus 50, and the open position is maintained so as to let the person pass through the passage 12. Upon unsuccessful face authentication, open/close control takes place so as not to let a person pass through the passage 12, with the open/close flap door 16 switched from the open position into the closed position.

When the closed position is the normal position, upon successful face authentication, open/close control takes place so as to let a person pass through the passage 12, with the open/close flap door 16 switched from the closed position into the open position. Upon unsuccessful face authentication, open/close control of the open/close flap door 16 does not take place, with the open/close flap door 16 maintained in the closed position so as not to let a person pass through the passage 12.

In this way, a space, formed by two housings 14, serving as the passage 12 is partitioned into front side and rear side of the open/close flap door 16 to configure a gate. A guide pattern 30 is provided at a stepping position for a person who passes through the passage 12 steps, and at least indicates a recommended standing position in order, for an imaging unit 102 provided halfway in the passage 12 toward the open/close flap door 16, to acquire an image suitable for face authentication. The guide pattern 30 may indicate a position in which a person places his/her feet while walking in the passage 12 when the face of the person is imaged. In the same position as the guide pattern 30 is arranged a sensor that detects presence of a person.

Figures 3A, 3B:
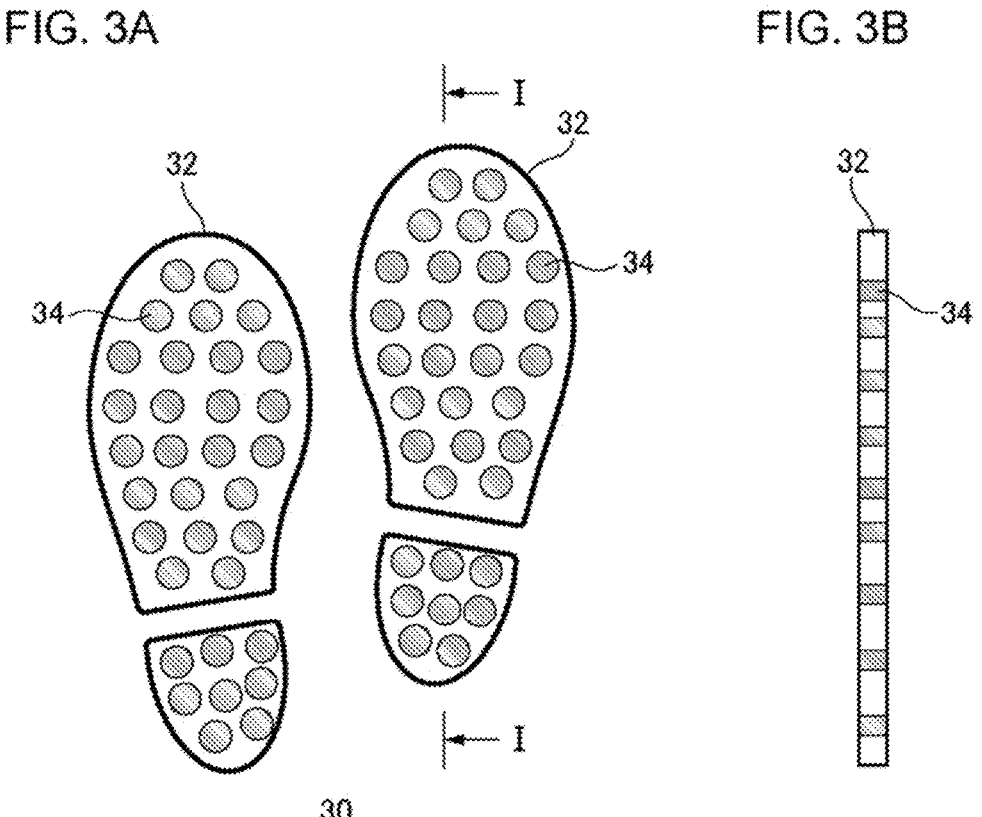
FIGS. 3A and 3B each illustrate an example of a guide pattern.

As described later, for example, the guide pattern 30 may have a shape of a footprint (FIGS. 3A and 3B). A toe of a footprint indicates a direction in which a person moves his/her feet. For example, an axis line connecting a toe and a heel through the center of the footprint in the guide pattern 30 indicates an orientation of the toe of the footprint. Relationship between an optical axis of an imaging unit 102 and the footprint in the guide pattern 30 is preferably such that the optical axis of the imaging unit 102 is substantially in parallel to the direction of the axis line indicating the orientation of the footprint, for example when viewed from above, and that the optical axis passes between left and right footprints.

As illustrated in FIG. 2, the camera unit 20 is installed beside the passage 12. The imaging unit 102 is installed in such a way that an angle formed between the optical axis of the imaging unit 102 and a travel direction of the passage 12 (a direction parallel to that of an inner side face of the housing 14) will be in a range of 0 degrees to 90 degrees. The imaging unit 102 may be installed in such a way that the optical axis of the imaging unit 102 will cross diagonally with the travel direction of the passage 12. For example, the imaging unit 102 may be installed in such a way that an angle formed between the optical axis of the imaging unit 102 and the travel direction of the passage 12 will be equal to or more than 30 degrees or equal to or less than 60 degrees.

A sensor 34 is arranged at a plurality of points or in at least a partial region of the guide pattern 30. A control unit 106 causes the imaging unit 102 to execute imaging when sensors 34 exceeding a predetermined ratio among the sensors 34 have detected presence of a person.

The sensor 34 is a photoelectronic sensor in this example. The sensor 34 may be a pressure sensor in another example. An example of a pressure sensor is described later. A photoelectronic sensor detects presence/absence of a subject depending on whether emitted signal light is received as reflected light, by using a reflective sensor for example. That is, a photoelectronic sensor detects whether a person is standing on the guide pattern 30. The sensor 34 according to the present example embodiment outputs an ON signal when detecting presence of a person. Note that signals output from the sensor 34 are not limited thereto.

FIGS. 3A and 3B each illustrate an example of the guide pattern 30. FIG. 3A is a top view of the guide pattern 30. FIG. 3B is a cross-sectional view taken along line I-I of the guide pattern 30 in FIG. 3A. The guide pattern 30 includes a plurality of sensors 34 dotting a foot mark region 32 having a shape of a footprint.

A film of a coat or a print of a predetermined paint is formed in the foot mark region 32 in this example. In a layer of the film, a plurality of sensors 34 is embedded (FIG. 3B). The film may be formed directly on a floor of the passage 12 or a sheet on which the film formed may be laid on the floor of the passage 12.

<Functional Configuration Example>

Figure 4:
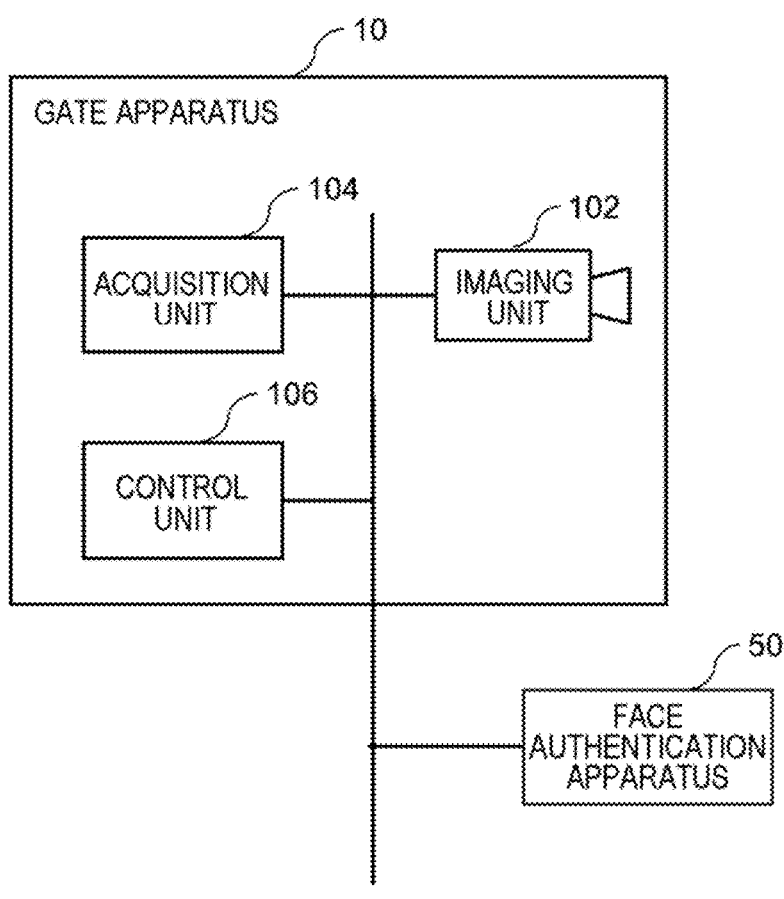
FIG. 4 illustrates a functional configuration example of a gate apparatus according to the present example embodiment.

FIG. 4 illustrates a functional configuration example of the gate apparatus 10 according to the present example embodiment.

In the following figures, configuration of a part that is irrelevant to the essence of the some non-limiting embodiments is omitted and not illustrated.

The gate apparatus 10 includes the imaging unit 102, an acquisition unit 104, and the control unit 106. The imaging unit 102 images a person passing through a passage leading to a gate through which a face authentication target person passes. The acquisition unit 104 acquires a detection result from the detection unit (sensor 34) that detects presence of a person. The sensor 34 is provided on the floor of the passage 12. The floor of the passage 12 is not only a surface of the passage 12 but may be inside a flooring of the passage 12 or beneath the flooring of the passage 12. The sensor 34 is provided at a position on which a person who passes through the passage 12 toward a gate steps. The control unit 106 controls, by using the detection result of the sensor 34 acquired by the acquisition unit 104, imaging timing of the imaging unit 102 that images a person passing through the passage 12.

The imaging unit 102 is a camera including imaging elements such as a lens and a charge coupled device (CCD) image sensor. The camera includes a mechanism that adjusts or controls focusing, exposure correction, an aperture value, a shutter speed, an ISO sensitivity or the like, or may be automatically controlled in order to improve a picture quality of an imaged face image of a person thereby obtaining an optimum feature value for face image authentication.

An image generated by the imaging unit 102 is preferably imaged in real time and transmitted to the face authentication apparatus 50. Note that an image transmitted to the face authentication apparatus 50 need not be directly transmitted from the imaging unit 102 but may be an image with a delay of a predetermined time period. An image imaged by the imaging unit 102 may be stored temporarily in another storage apparatus (not illustrated) and read out by the face authentication apparatus 50 from the storage apparatus sequentially or at predetermined intervals. Further, an image transmitted to the face authentication apparatus 50 may favorably be a moving image but may be a frame image at predetermined intervals, or a still image.

<Hardware Configuration Example>

Figure 5:
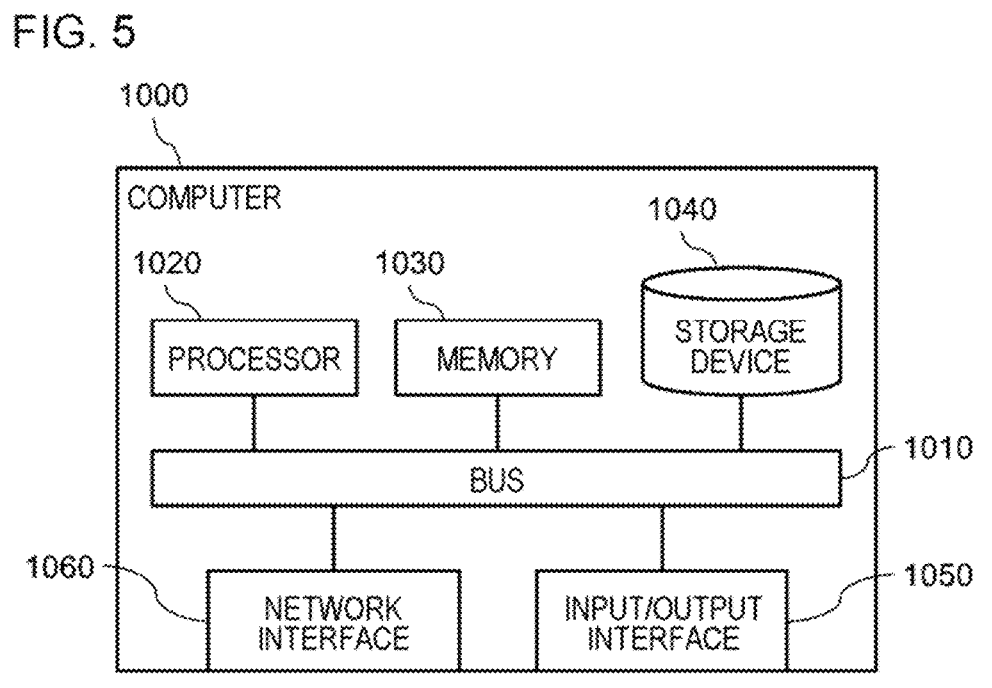

FIG. 5 is a block diagram illustrating a hardware configuration of a computer 1000 that achieves the gate apparatus 10.

The computer 1000 includes a bus 1010, a processor 1020, a memory 1030, a storage device 1040, an input/output interface 1050, and a network interface 1060.

The bus 1010 is a data transmission path used by the processor 1020, the memory 1030, the storage device 1040, the input/output interface 1050, and the network interface 1060 transmit/receive data to/from each other. Note that a method for interconnecting the processor 1020 and the like is not limited to a bus connection.

The processor 1020 is a processor achieved by a central processing unit (CPU), a graphics processing unit (GPU) or the like.

The memory 1030 is a main storage achieved by a random access memory (RAM) or the like.

The storage device 1040 is an auxiliary storage achieved by a hard disk drive (HDD), a solid state drive (SSD), a memory card, a read only memory (ROM) or the like. The storage device 1040 stores program modules that achieve functions of the data apparatus 10 (for example, the imaging unit 102, the acquisition unit 104, the control unit 106, and an estimation unit 108 described later). When the processor 1020 loads the programs modules onto the memory 1030 and executes the programs modules, functions related to the program modules are achieved. The storage device 1040 also functions as various types of storage units.

A program module may be recorded on a storage medium. A storage medium that records a program module includes a medium available to a non-transitory tangible computer 1000 and a program code readable by the computer 1000 (processor 1020) may be embedded in the medium.

The input/output interface 1050 is an interface used to connect the gate apparatus 10 to various input/output devices (such as the display unit 22).

The network interface 1060 is an interface used to connect the gate apparatus 10 to another apparatus on the communication network 3 (such as the face authentication apparatus 50). Note that the network interface 1060 may be unused.

<Operation Example>

Figure 6:
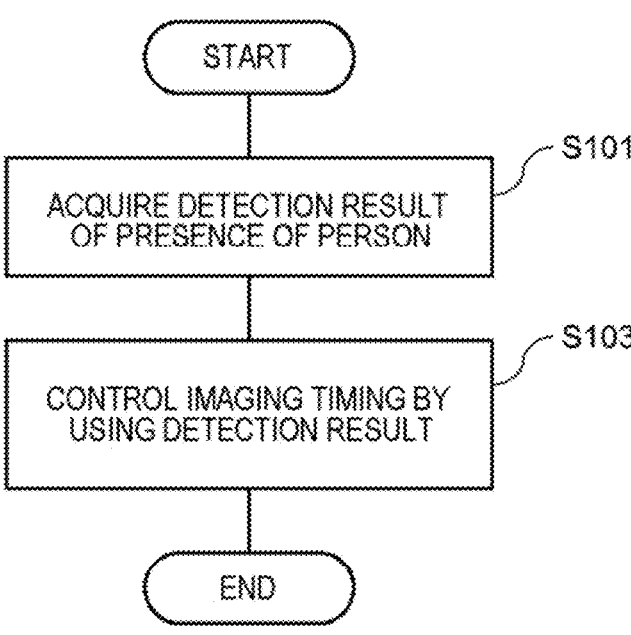
FIG. 6 is a flowchart illustrating an operation example of the gate apparatus according to the present example embodiment.

FIG. 6 is a flowchart illustrating an operation example of the gate apparatus 10 according to the present example embodiment. First, the acquisition unit 104 acquires a detection result of the sensor 34 that detects presence of a person (step S101). The control unit 106 controls imaging timing of the imaging unit 102 by using the detection result acquired in step S101 (step S103).

Figures 7A, 7B:
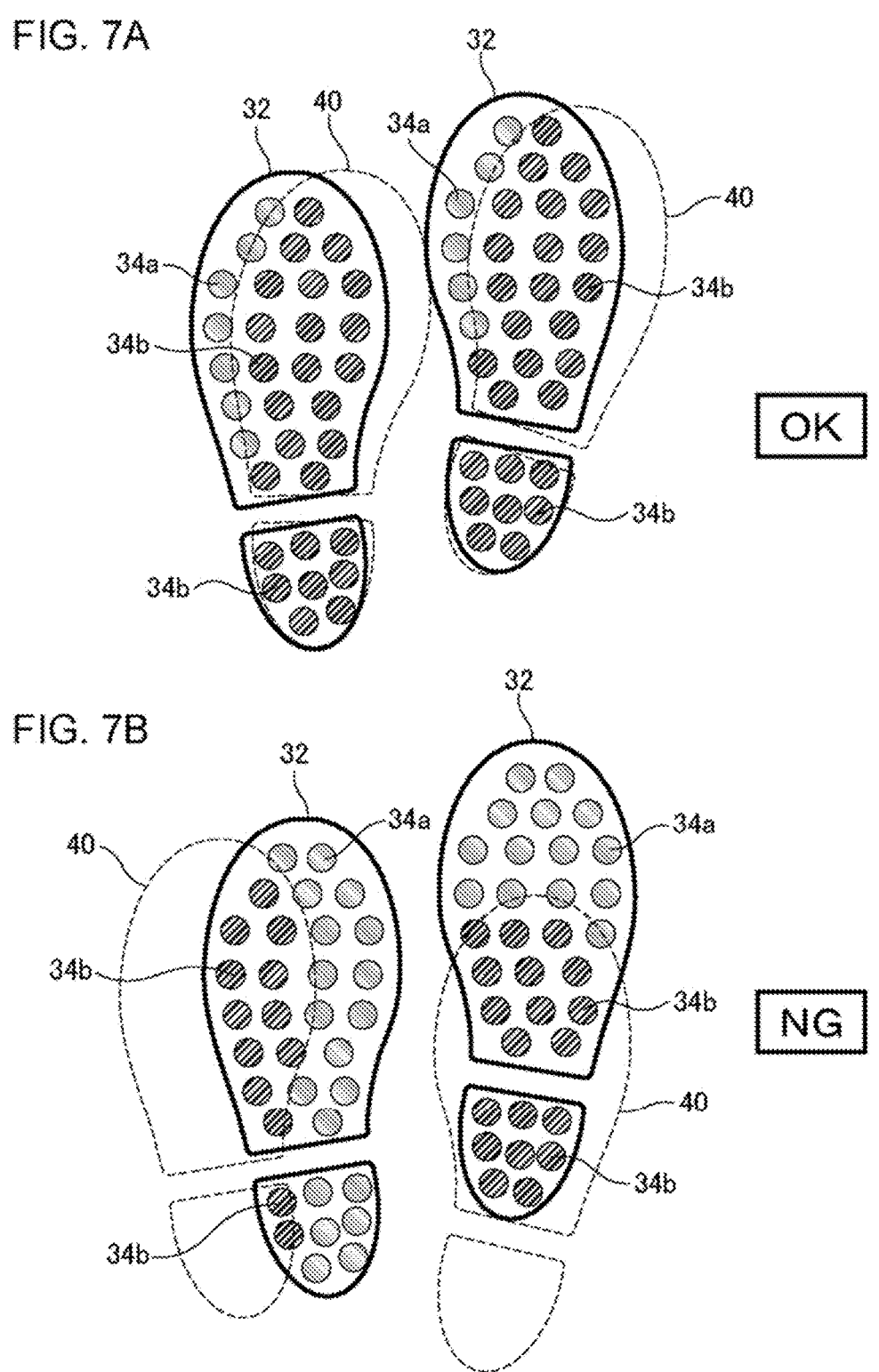
FIGS. 7A and 7B each illustrate an example of a guide pattern, a stepping position for a person, and a detection result.
Figure 8:
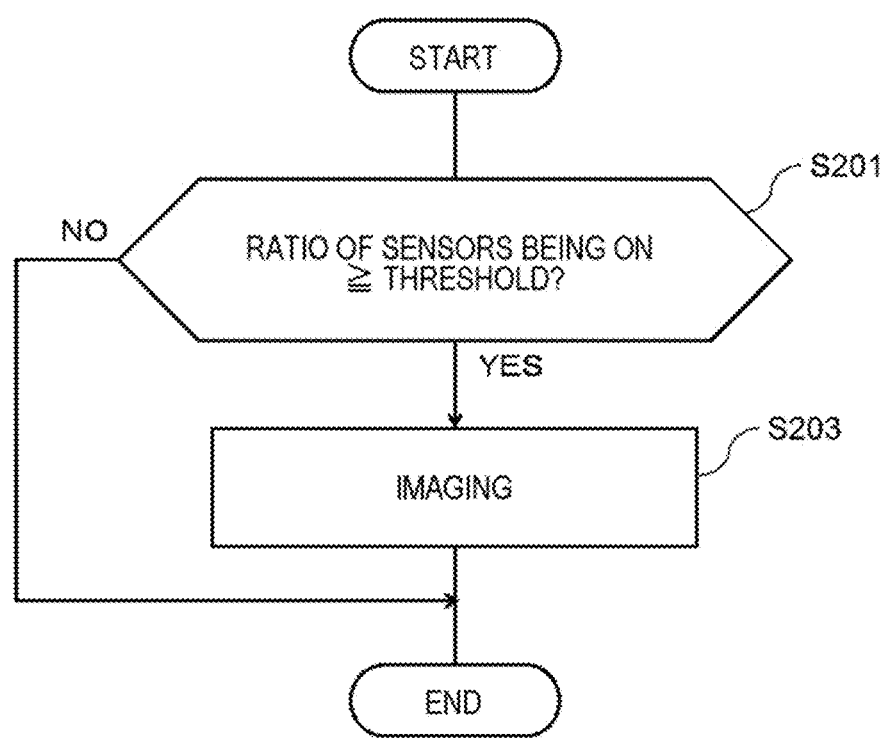
FIG. 8 is a flowchart illustrating a specific operation example of the gate apparatus assumed when the guide pattern illustrated in FIGS. 7A and 7B is used.

FIGS. 7A and 7B each illustrate an example of the guide pattern 30, a stepping position for a person (illustrated by broken lines 40 in the figure), and a detection result. FIG. 8 is a flowchart illustrating a specific operation example of the gate apparatus 10 assumed when the guide pattern 30 illustrated in FIGS. 7A and 7B is used.

A flow of FIG. 8 starts when entry of a person into the passage 12 is detected by an entry sensor 18 of FIG. 2. Various conditions for termination of a flow are perceived and exemplified below in a nonlimitative fashion. A flow may be terminated at least in any one of the following conditions:

(1) A face image of a person is acquired by the imaging unit 102;

(2) Face authentication by the face authentication apparatus 50 has succeeded;

(3) The open/close flap door 16 is opened; and (4) A face size and an interpupillary distance of an authentication target person have satisfied predetermined criteria in a captured image.

The acquisition unit 104 determines whether a ratio of the sensor 34b outputting an ON signal is above a threshold (step S201). The ratio of the sensor 34b outputting the ON signal is represented by a ratio of the number of sensors 34b outputting the ON signal to the total number of sensors 34 embedded in the foot mark region 32 of FIGS. 7A and 7B. A threshold is specified that determines how precisely a person is standing on the guide pattern 30 oriented in such a way that a person's face will be oriented to the imaging unit 102. Any deviation in a stepping position of a person from the foot mark region 32 of the guide pattern 30 increases the number of sensors 34a not outputting the ON signal and decreases the ratio of the sensor 34b outputting the ON signal.

For example, when a person steps on the guide pattern 30 as in FIG. 7A, the guide pattern 30 and the stepping position 40 for the person substantially overlap each other. Accordingly, a ratio of the sensor 34b outputting the ON signal becomes equal to or more than the threshold in step S201. The acquisition unit 104 passes the detection result to the control unit 106. Since the ratio of the sensor 34b outputting the ON signal becomes equal to or more than the threshold (YES in step S201), the control unit 106 instructs, based on this detection result, the imaging unit 102 to perform imaging (step S203).

When a person steps on the guide pattern 30 as in FIG. 7B, the guide pattern 30 and the stepping position 40 for the person deviate from each other. Thus, a ratio of the sensor 34b outputting the ON signal is below the threshold in step S201. The acquisition unit 104 passes the detection result to the control unit 106. Since the ratio of the sensor 34b outputting the ON signal is below the threshold (NO in step S201), the control unit 106 bypasses step S203 based on this detection result.

Figure 20:
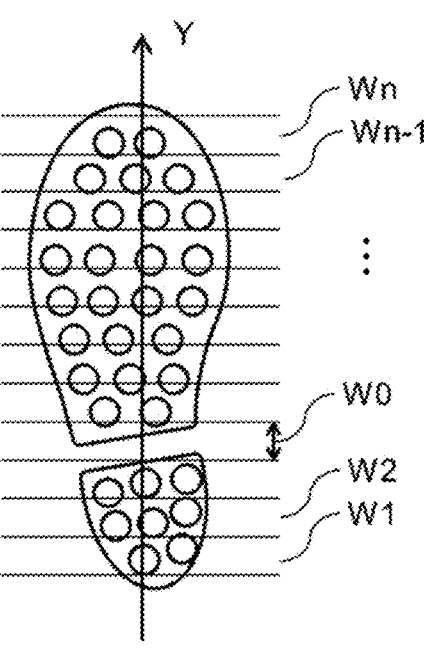
FIG. 20 explains distribution of sensors in a guide pattern.

In addition to the ratio of the sensor 34b outputting the ON signal, determination of imaging timing may be based on a distribution of sensors 34b outputting the ON signal. For example, as illustrated in FIG. 20, concerning a plurality of sensors 34 arranged at the guide pattern 30, a region of a footprint is divided by n in parallel with respect to a travel direction Y (a direction connecting a heel and a toe of the footprint) to obtain a ratio of the number of sensors 34b outputting the ON signal to the number of sensors 34 included in each region W1 to Wn (n being a natural number). The region of the footprint is divided by n in such a way that as many sensors 34 as will allow a deviation between the footprint and the stepping position be detected within the threshold, for example, will be included in the region W.

When a distribution of the number of sensors 34b in each region W has a small dispersion, it may be determined that it is imaging timing. For example, when regions W in which a ratio of sensors 34b outputting the ON signal is equal to or more than a threshold P exist in succession over a reference with respect to a travel direction, the distribution is determined to have no dispersion.

Figure 21A:
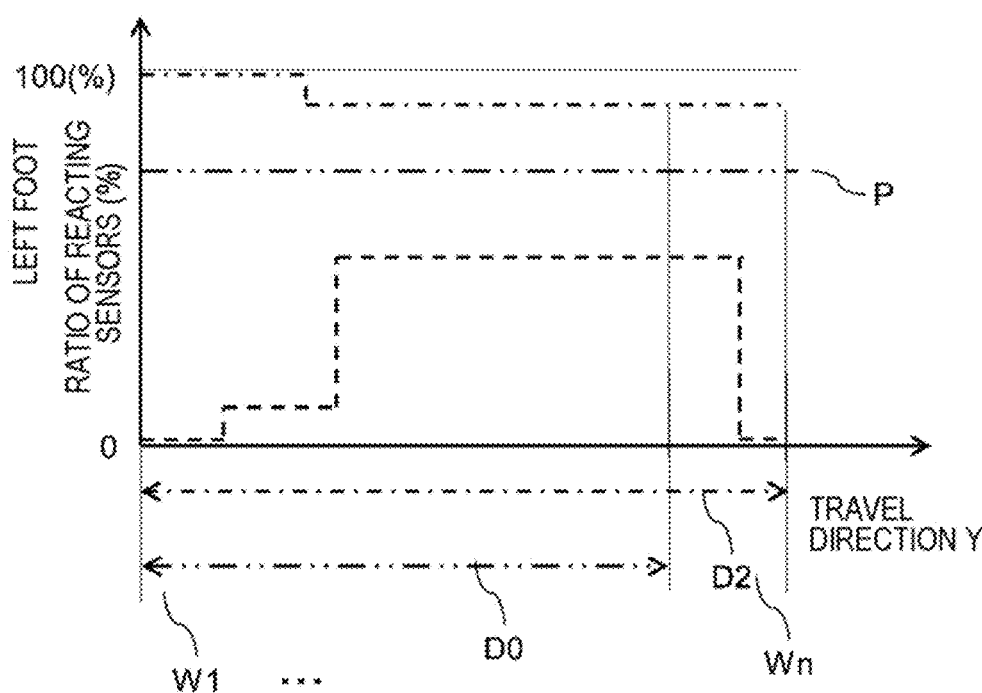
FIGS. 21A and 21B each illustrate a distribution region of reaction of sensors in the guide pattern.
Figure 21B:
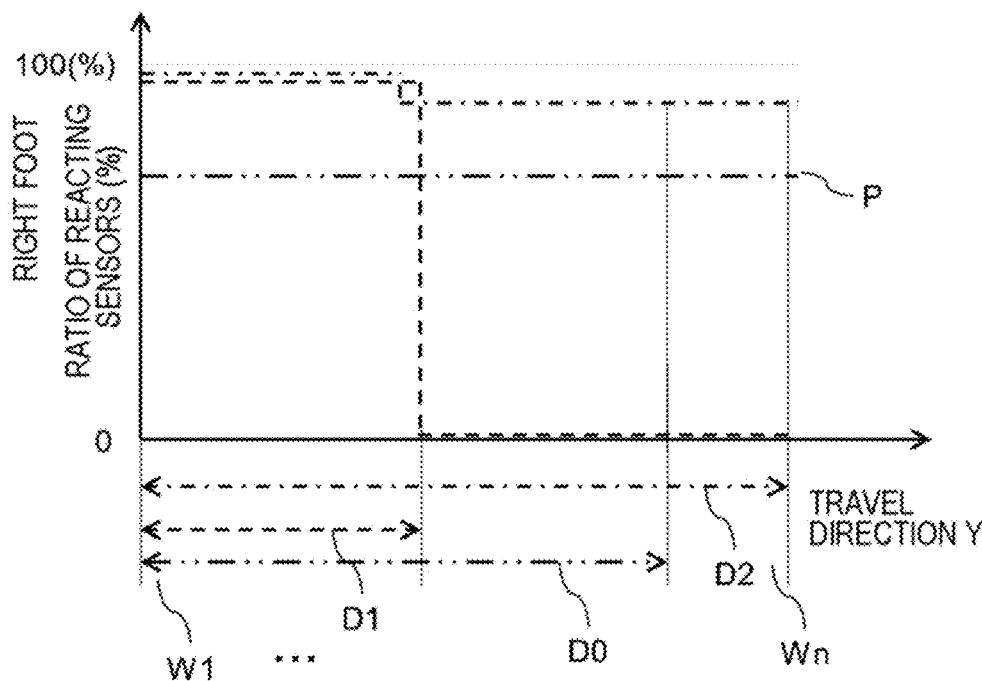

To be more precise, when regions W in which a ratio (%) of the sensor 34b outputting the ON signal with respect to a travel direction is equal to or more than the threshold P exist in succession over a reference range D0 with respect to a travel direction, it may be determined that it is imaging timing. FIGS. 21A and 21B each illustrate a distribution of a response of a sensor 34b in FIGS. 7A and 7B. Note that a region W0 in FIG. 20 includes no sensors 34, so that the region W0 is excluded in FIGS. 21A and 21B. A start point of a horizontal axis in a travel direction Y in FIGS. 21A and 21B indicates a state of reaction of sensors 34 in a region W1 at a heel of the footprint of the guide pattern 30 in FIG. 20. A right end of the horizontal axis in a travel direction Y in FIGS. 21A and 21B indicates a state of reaction of sensors 34 in a region Wn at a toe of the footprint of the guide pattern 30 in FIG. 20.

FIG. 21A illustrates a left foot and FIG. 21B illustrates a right foot. A ratio of the number of sensors 34b outputting the ON signal to the number of sensors 34 installed in regions W1 to Wn is illustrated in a dot chain line and a broken line. In both FIG. 21A and FIG. 21B, a dot chain line indicates a distribution of reaction of sensors 34b in FIG. 7A and a broken line indicates a distribution of reaction of sensors 34b in FIG. 7B. The threshold P is indicated by a two-dot chain line and a reference range D is indicated by an arrow of a two-dot chain line.

With reference to FIGS. 21A and 21B, a ratio of the sensor 34b outputting the ON signal as indicated by a dot chain line related to FIG. 7A exceeds, for the left foot in FIG. 21A and the right foot in FIG. 21B, the threshold P in the regions W1 to Wn. In other words, a range D2 of regions in succession exceeds the reference range D0, so that a distribution of the ratio is determined to have no dispersion. In the present example indicated by a dot chain line related to FIG. 7A, it is determined that it is imaging timing.

On the other hand, a ratio of the sensor 34b outputting the ON signal as indicated by a broken line related to FIG. 7B substantially varies at first glance, for the left foot in FIG. 21A and the right foot in FIG. 21B, with respect to a travel direction.

In particular, for the left foot in FIG. 21A, there is no region W in which a ratio of the sensor 34b outputting the ON signal as indicated by a broken line related to FIG. 7B exceeds the threshold P (a two-dot chain line). For the right foot in FIG. 21B, the range D1 including a succession of regions W in which a ratio of the sensor 34b outputting the ON signal as indicated by a broken line related to FIG. 7B exceeds the threshold P is indicated by an arrow of a broken line and is below the reference range D0 as indicated by a two-dot chain line. Accordingly, in the present example indicated by a broken line related to FIG. 7B, it is determined that it is not imaging timing.

In this way, determination of imaging timing may be made based on a change in distribution of sensors 34b outputting the ON signal with respect to a travel direction.

Figures 9A, 9B:
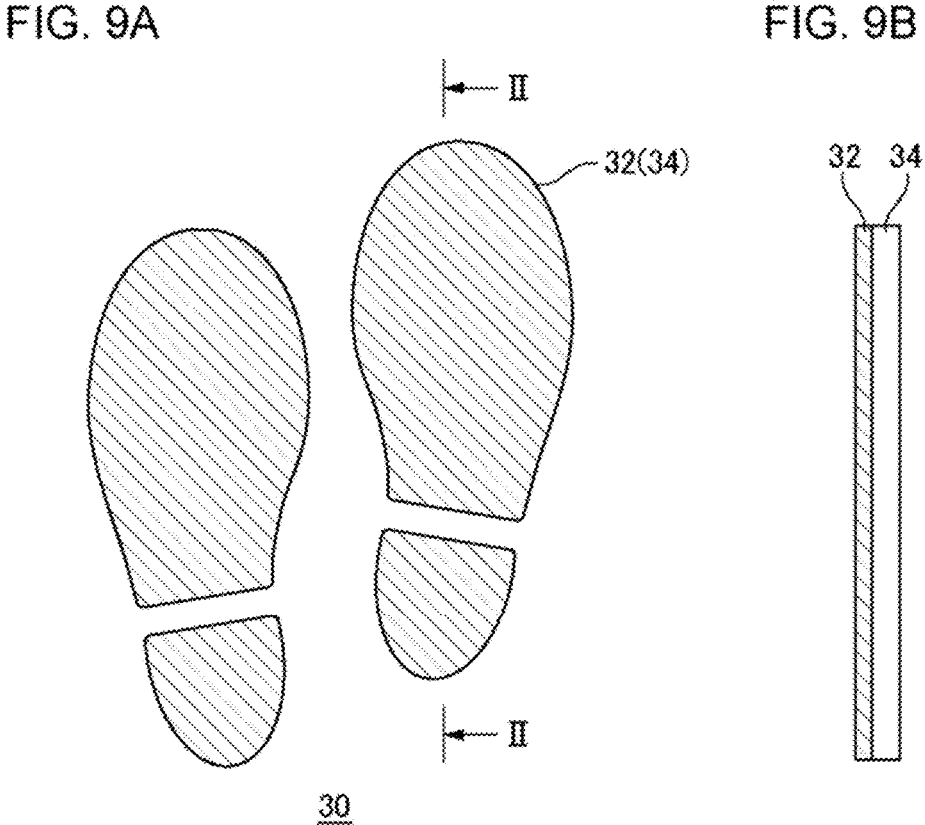
FIGS. 9A and 9B each illustrate another example of a guide pattern.

FIGS. 9A and 9B each illustrate another example of the guide pattern 30. FIG. 9A is a top view of the guide pattern 30. FIG. 9B is a cross-sectional view taken along line I-I of the guide pattern 30 in FIG. 9A. The guide pattern 30 includes the foot mark region 32 and a sheet-shaped pressure sensor 34, and the sensor 34 has approximately the same shape as the foot mark region 32 and is arranged in approximately the same location. The sensor 34 extends beneath the foot mark region 32 while overlapping the foot mark region 32. The pressure sensor reacts to a pressure applied when a person stands on the same and outputs a value related to an area of a reacting region. Also in this example, as described earlier, determination that is based on distribution of reacting regions may be perceived. For example, when a distribution of regions in which sensors 34 are reacting has a small dispersion in a travel direction of a footprint of the guide pattern 30, it may be determined that it is imaging timing.

Figures 10A, 10B:
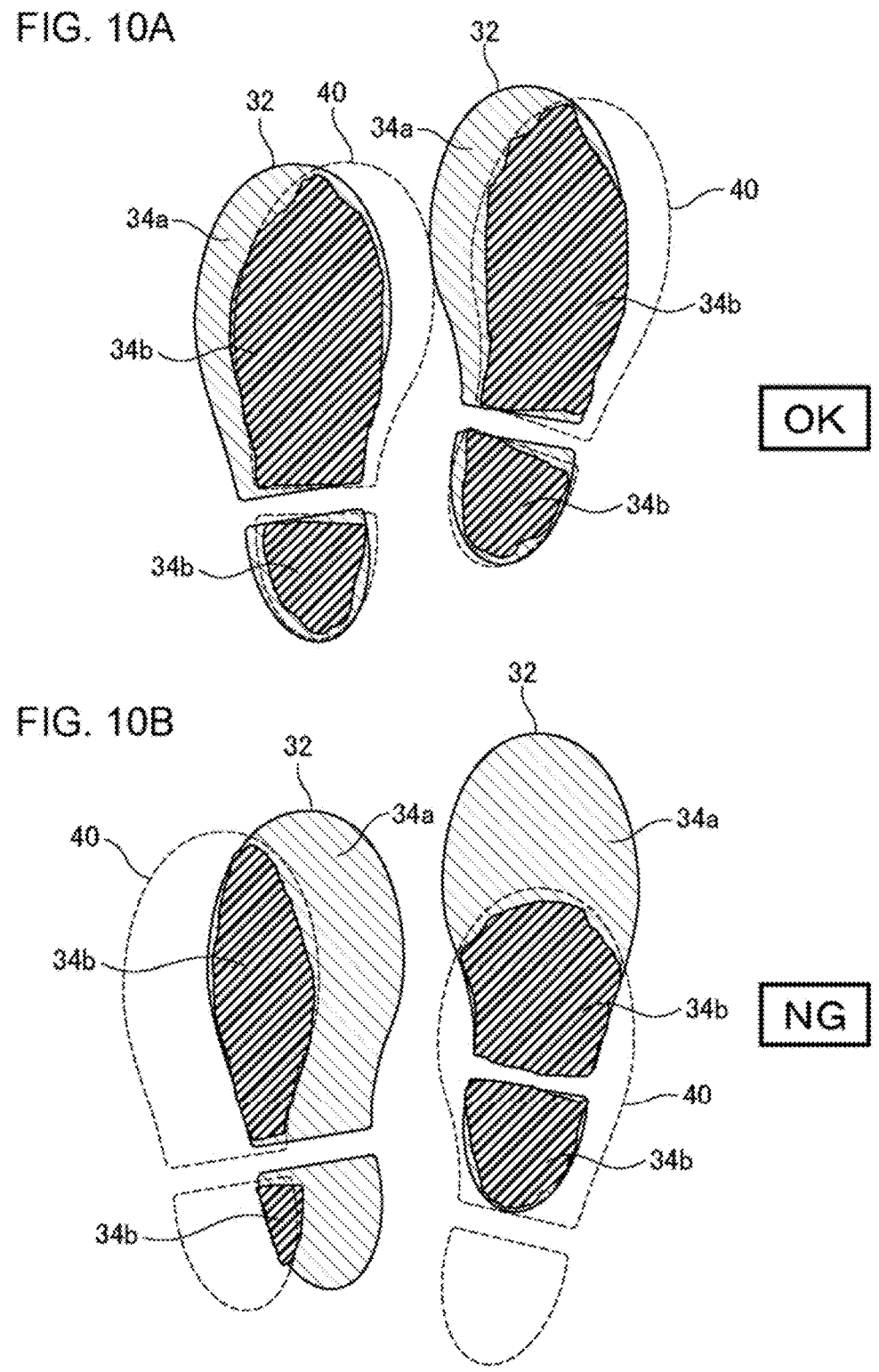
FIGS. 10A and 10B each illustrate an example of a guide pattern, a stepping position for a person, and a detection result.
Figure 11:
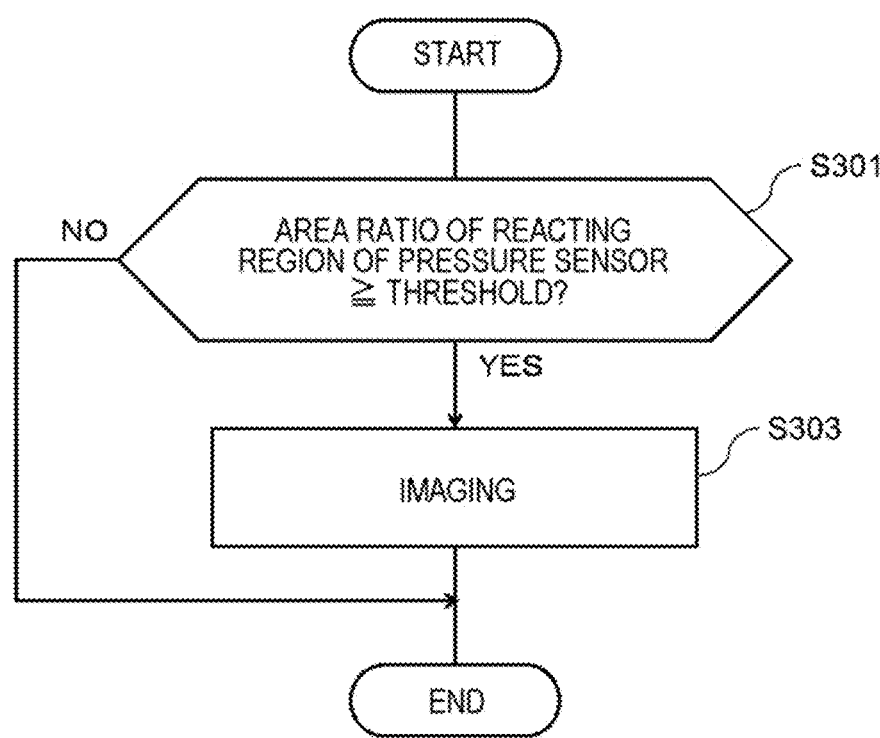
FIG. 11 is a flowchart illustrating a specific operation example of a gate apparatus assumed when the guide pattern illustrated in FIGS. 10A and 10B is used.

FIGS. 10A and 10B each illustrate an example of the guide pattern 30, a stepping position for a person (illustrated by a broken line 40 in the figure), and a detection result. FIG. 11 is a flowchart illustrating a specific operation example of the gate apparatus 10 assumed when the guide pattern 30 illustrated in FIGS. 10A and 10B is used. Start and stop conditions for a flow in FIG. 11 are similar to those in FIGS. 7A and 7B.

In this example, the acquisition unit 104 determines whether an area ratio of a reacting region of the pressure sensor is equal to or more than a threshold (step S301). The area ratio of the reacting region is indicated by an area ratio of a reacting region of the sensor 34 (indicated as 34b in the figure) provided in the same shape as the foot mark region 32 below the foot mark region 32 in FIGS. 10A and 10B to the entire area of the foot mark region 32. A non-reacting region of the sensor 34 is indicated as 34a.

When a stepping position is deviated from the foot mark region 32 of the guide pattern 30, the area ratio decreases and when a person stands on the guide pattern 30 in a precise position, the area ratio increases.

For example, when a person stands on the guide pattern 30 as in FIG. 10A, the guide pattern 30 substantially overlaps the stepping position 40 for a person. Thus, in step S301, an area ratio of the reacting region 34b of the sensor 34 is equal to or more than a threshold. The acquisition unit 104 passes the detection result to the control unit 106. Since the area ratio of the reacting region 34b of the sensor 34 is equal to or more than the threshold (YES in step S301), the control unit 106 instructs, based on this detection result, the imaging unit 102 to perform imaging (step S303).

When a person steps on the guide pattern 30 as in FIG. 10B, the guide pattern 30 and the stepping position 40 for the person deviate from each other. Thus, an area ratio of a reacting region 34b of the sensor 34 is below the threshold in step S301. The acquisition unit 104 passes the detection result to the control unit 106. Since the area ratio of the reacting region 34b of the sensor 34 is below the threshold (NO in step S301), the control unit 106 bypasses step S303 based on this detection result.

Figure 12:
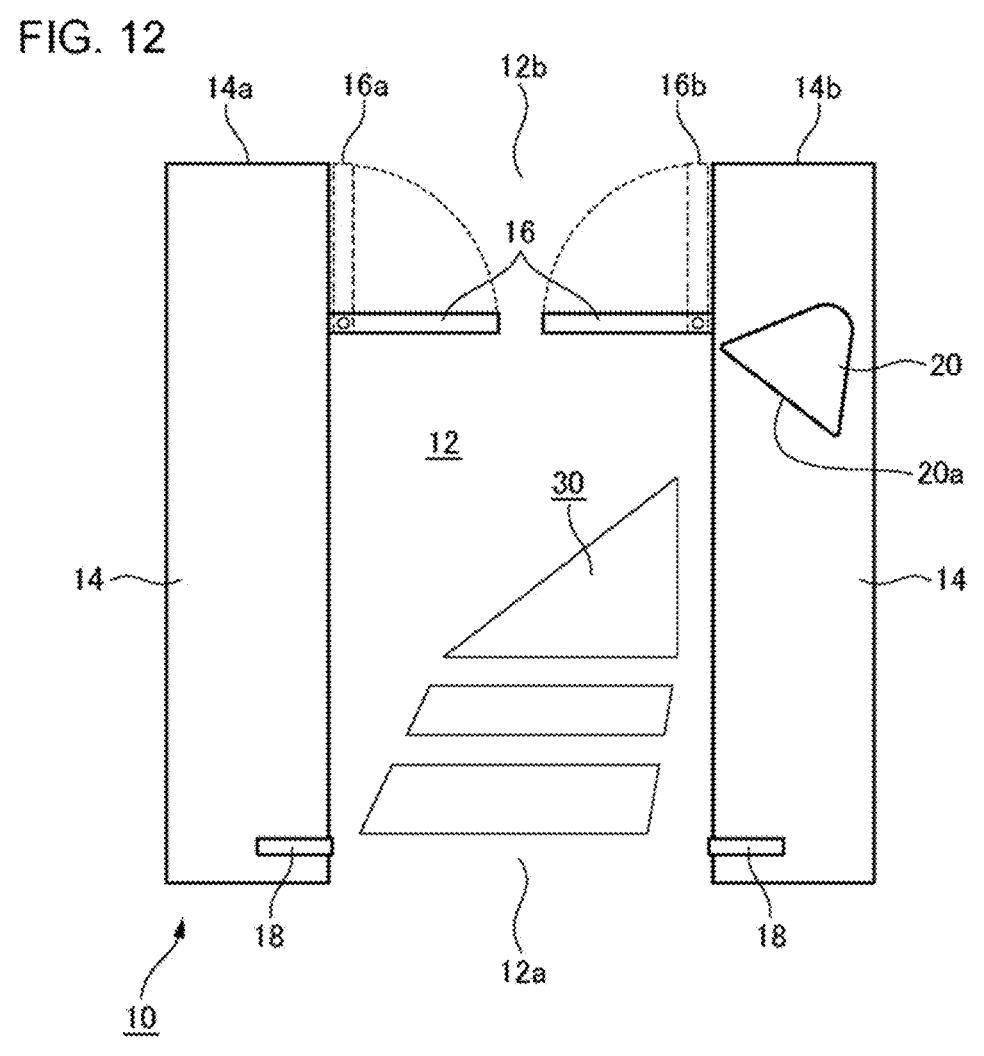

FIG. 12 is a top view of the gate apparatus 10 illustrating an example of another guide pattern 30.

In this example, the guide pattern 30 is provided in a shape that indicates to a person a direction or a route in which the person must advance to guide the person toward the camera unit 20 provided beside the passage 12. In this example, the guide pattern 30 may be projected on a floor of the passage 12 by using a projector (not illustrated) installed above the housing 14. In this case, the guide pattern 30 may be an animation moving in a travel direction. In this example, the above-described sensor 34 is provided in a region, among the floor regions of the passage 12, in which it can be determined whether a person is stepping on a position to help the imaging unit 102 acquire an image suitable for authentication processing.

According to the present example embodiment, the sensor 34 is provided on the guide pattern 30 provided in a position on which a person who passes through the passage 12 leading to a gate steps, the guide pattern 30 guiding the person to orient his/her face toward the imaging unit 102, and the acquisition unit 104 uses the sensor 34 to detect presence of a person in the passage 12 and the control unit 106 controls imaging timing of a face image by the imaging unit 102 based on the detection result. This allows the gate apparatus 10 to image a face image of an authentication target person with imaging timing that helps acquire a face image suitable for face authentication. As a result, face authentication accuracy is improved.

In this configuration, the imaging unit 102 (camera unit 20) is installed beside the passage 12. It is thus difficult to image a person passing through the passage 12 from the front.

Further, when an installation place of a gate of the gate apparatus 10 has a limited space, the passage 12 may be shortened, which limits a time interval used to image a face image. This makes it difficult to acquire a face image suitable for face authentication. Even in these cases, the gate apparatus 10 according to the present example embodiment performs face authentication processing without decreasing an accuracy.

Second Example Embodiment

Figure 13:
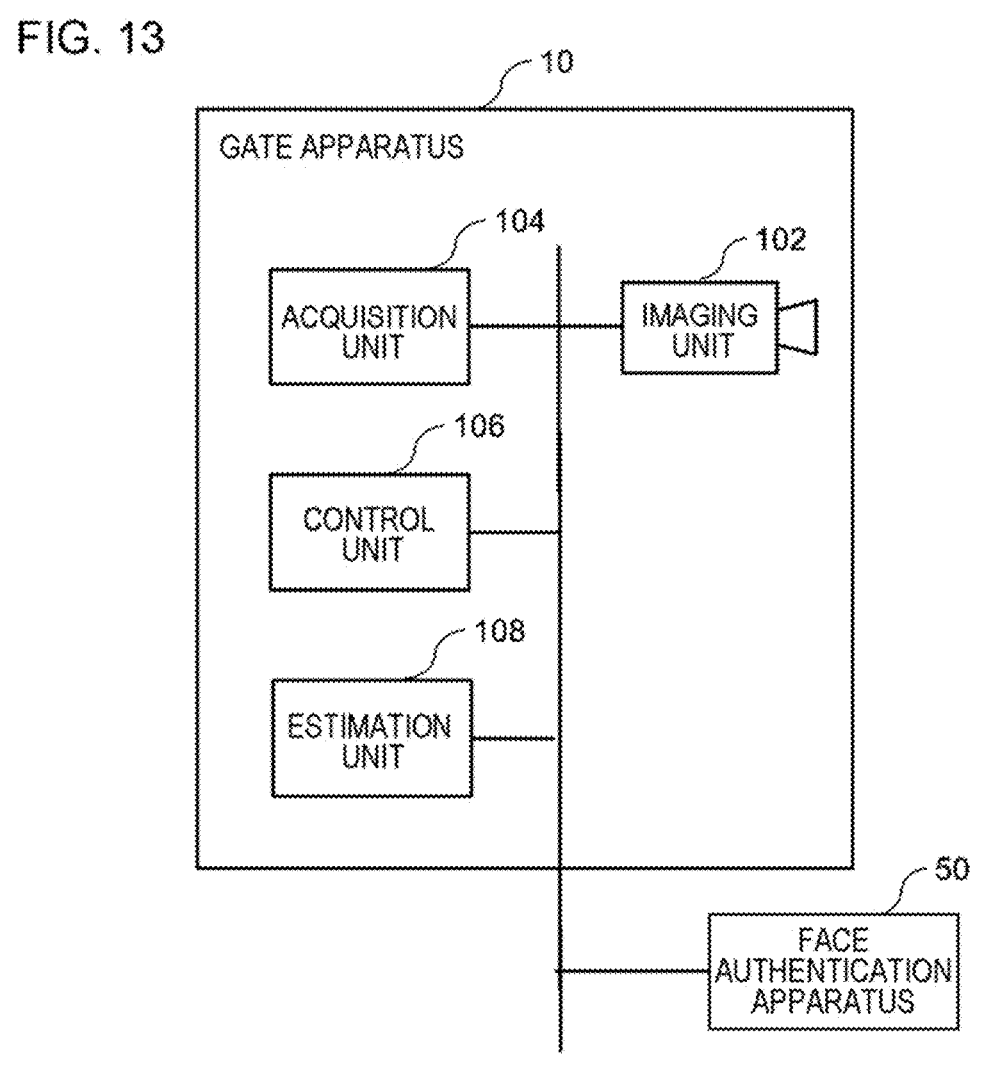

FIG. 13 illustrates a functional configuration example of a gate apparatus 10 according to the present example embodiment. The gate apparatus 10 according to the present example embodiment is similar to that of the foregoing example embodiment except that a configuration is included to estimate a line of sight or a face orientation of an authentication target person.

The gate apparatus 10 includes an estimation unit 108 in addition to the configuration of the gate apparatus 10 in FIG. 4. The estimation unit 108 estimates, based on an image of a person imaged by an imaging unit 102, a line of sight or a face orientation of the person. A control unit 106 controls imaging timing by using an estimation result by the estimation unit 108.

FIG. 14 is a flowchart illustrating an operation example of the gate apparatus 10 according to the present example embodiment. This flow is executed subsequently to step S103 of the flow according to the foregoing example embodiment in FIG. 6. Alternatively, this flow may be executed subsequently to step S203 in FIG. 8 or step S303 in FIG. 11.

The estimation unit 108 performs image recognition processing on an image of a person imaged by the imaging unit 102 and estimates a line of sight or a face orientation of the person with respect to a camera (step S401). The control unit 106 determines whether imaging conditions are satisfied based on whether the estimated line of sight or face orientation of the person is toward a camera (YES in step S403). On the other hand, when the estimated line of sight or face orientation of the person is not toward a camera (NO in step S403), the control unit 106 determines that imaging conditions are not satisfied.

The imaging conditions may be that the person is imaged within a predetermined angle range based on a state of a face facing a camera or the line of sight. When it is determined that the estimated line of sight or face orientation of the person is toward the camera, the control unit 106 causes the imaging unit 102 to perform imaging (step S405).

According to the present example embodiment, a line of sight or a face orientation of a face authentication target person is estimated by the estimation unit 108, and imaged by the imaging unit 102 when the line of sight or face orientation of the face authentication target person is toward a camera. This configuration provides similar advantages as the foregoing example embodiment and acquires a face image that is more suitable for face authentication. This improves an accuracy of face authentication.

Figure 15:
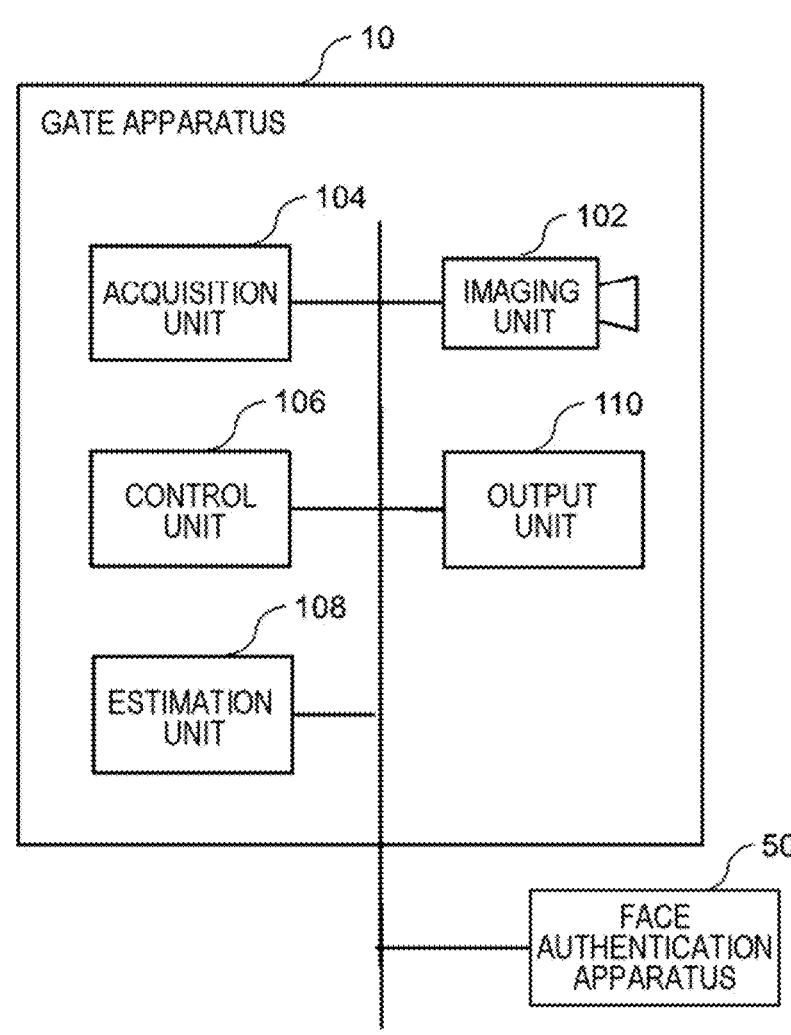
FIG. 15 illustrates a functional configuration example of the gate apparatus according to the present example embodiment.

FIG. 15 illustrates a functional configuration example of the gate apparatus 10 according to the present example embodiment. The gate apparatus 10 according to the present example embodiment is similar to that of the foregoing example embodiment except that a configuration is included to perform predetermined output when it is not appropriate timing for imaging to be executed.

When the control unit 106 has determined that it is not appropriate timing for imaging to be executed, an output unit 110 performs predetermined output. The predetermined output includes displaying on a display unit 22 (FIG. 16) or outputting voice guidance from a loudspeaker (not illustrated).

Figure 16:
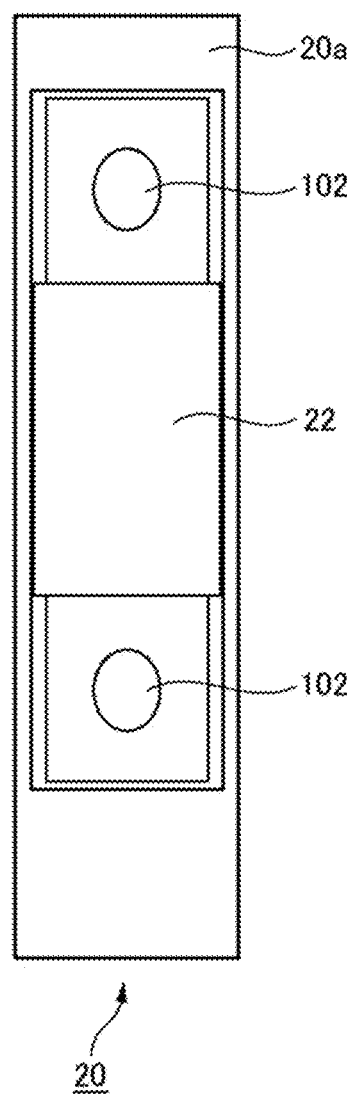
FIG. 16 is a front view of a camera unit.

FIG. 16 is a front view of a camera unit 20. The camera unit 20 includes the display unit 22 at the center of a front face of a housing thereof. The display unit 22 is preferably arranged at a height with a view of a person passing through a passage 12. For example, a height of installation may be determined from an average height of an adult.

Two cameras are provided as imaging units 102, one above and one below the display unit 22.

Figure 17:
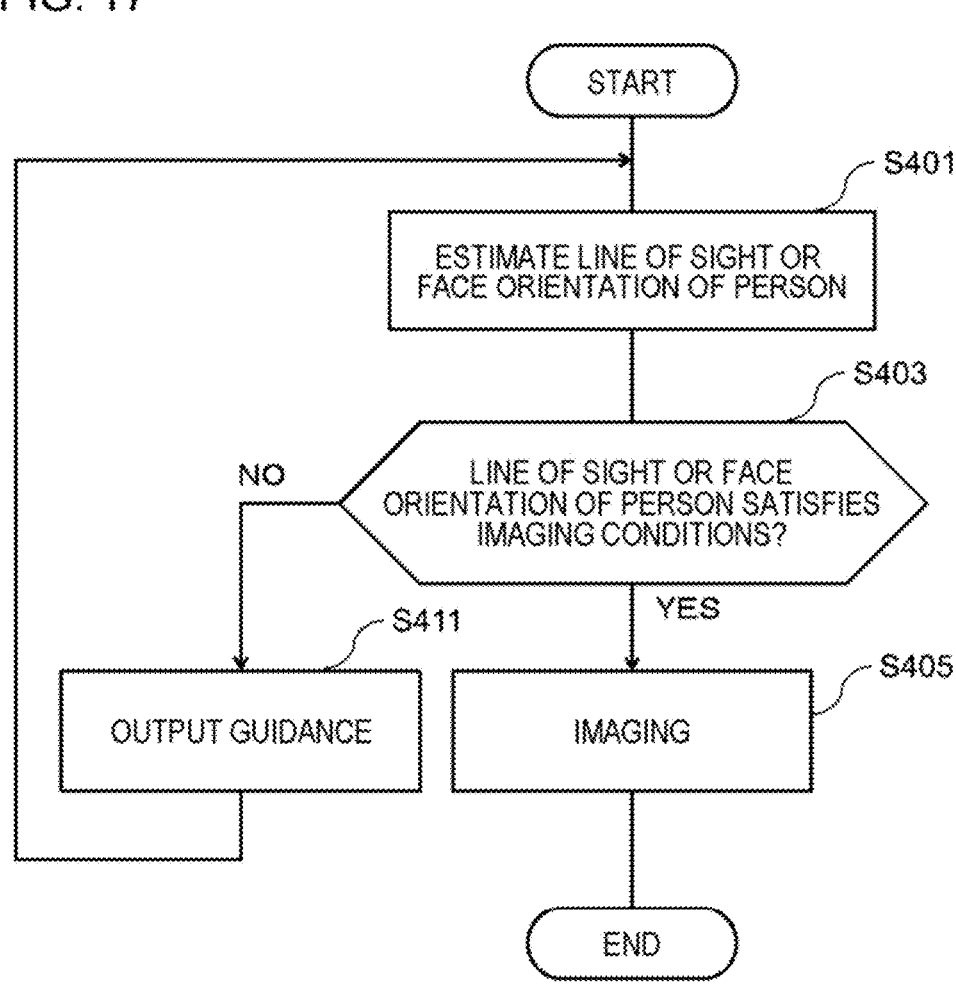
FIG. 17 is a flowchart illustrating an operation example of the gate apparatus according to the present example embodiment.

FIG. 17 is a flowchart illustrating an operation example of the gate apparatus 10 according to the present example embodiment. This flow includes the same steps S401 to S405 as in the flow of the foregoing example embodiment in FIG. 14, and additionally, step S411.

When it is determined in step S403 that imaging conditions are not satisfied since an estimated line of sight or face orientation of a person is not toward a camera (NO in step S403), controls proceed to step S411. The output unit 110 performs predetermined output (step S411).

For example, the output unit 110 displays guidance on the display unit 22 or perform voice output. Nonlimitative examples of guidance include "Please stand on the foot mark on the floor" and "Please look into the camera".

Note that, even when a threshold is not exceeded upon determination in step S201 in FIG. 8 or step S301 in FIG. 11 according to the foregoing example embodiment, control may proceed to step S411 in FIG. 17 and output guidance. Subsequently to step S411, control returns to determination processing in step S201 in FIG. 8 or step S301 in FIG. 11.

Figure 18:
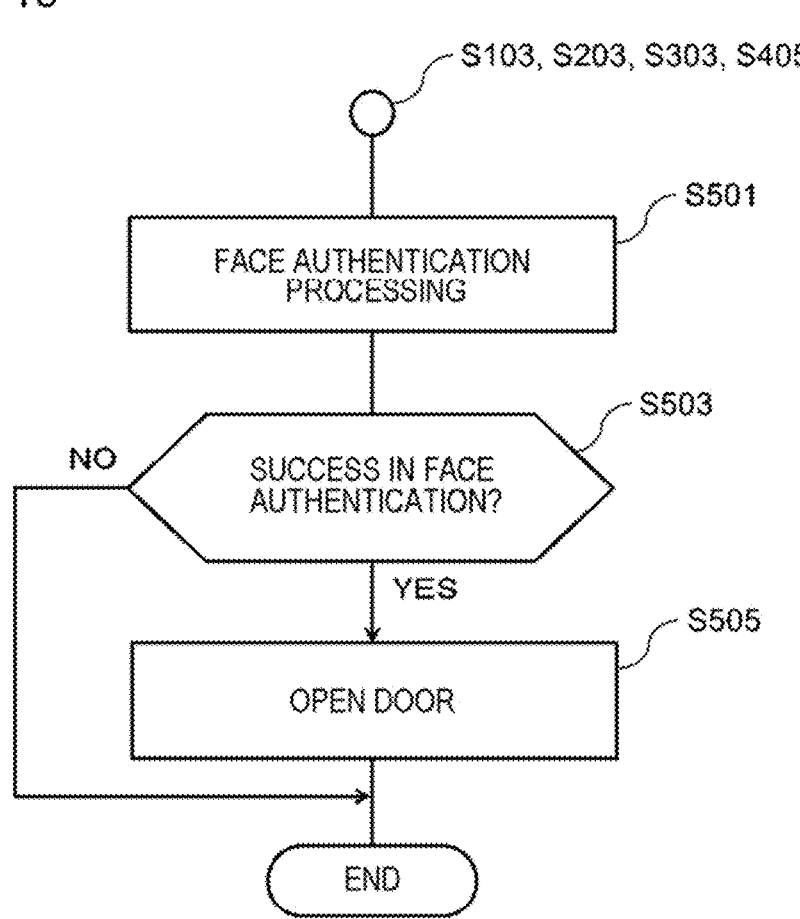
FIG. 18 is a flowchart illustrating an operation example of the gate system according to the present example embodiment.

FIG. 18 is a flowchart illustrating an operation example of a gate system 1 according to the present example embodiment. A flow of FIG. 18 starts once a face image of a person is imaged by the imaging unit 102 in each flow according to the foregoing example embodiment.

A face image imaged by the imaging unit 102 is transmitted to a face authentication apparatus 50, which performs authentication processing (step S501). When an authentication result by the face authentication apparatus 50 is successful (YES in step S503), a gate control mechanism (not illustrated) controls an open/close flap door 16 to open the open/close flap door 16 (step S505). Upon failure in face authentication by the face authentication apparatus 50 (NO in step S503), step S505 is bypassed and the open/close flap door 16 remains closed. Note that various types of processing subsequent to failure in authentication processing in step S503 are perceived and are not limited thereto. For example, a notice may be output to nearby staff or only recording is done and the open/close flap door 16 may be opened to guide a person to pass through a gate. The recording may store an imaged image and date/time information associated with the same.

With this configuration, when it is determined that imaging conditions are not satisfied, the output unit 110 can display guidance for imaging a face image suitable for face authentication or perform voice output. This tells an authentication target person how to behave in order to get a face image suitable for face authentication imaged. Moreover, according to the present example embodiment, it is possible to reduce authentication of face authentication and improve an authentication accuracy.

Figure 19:
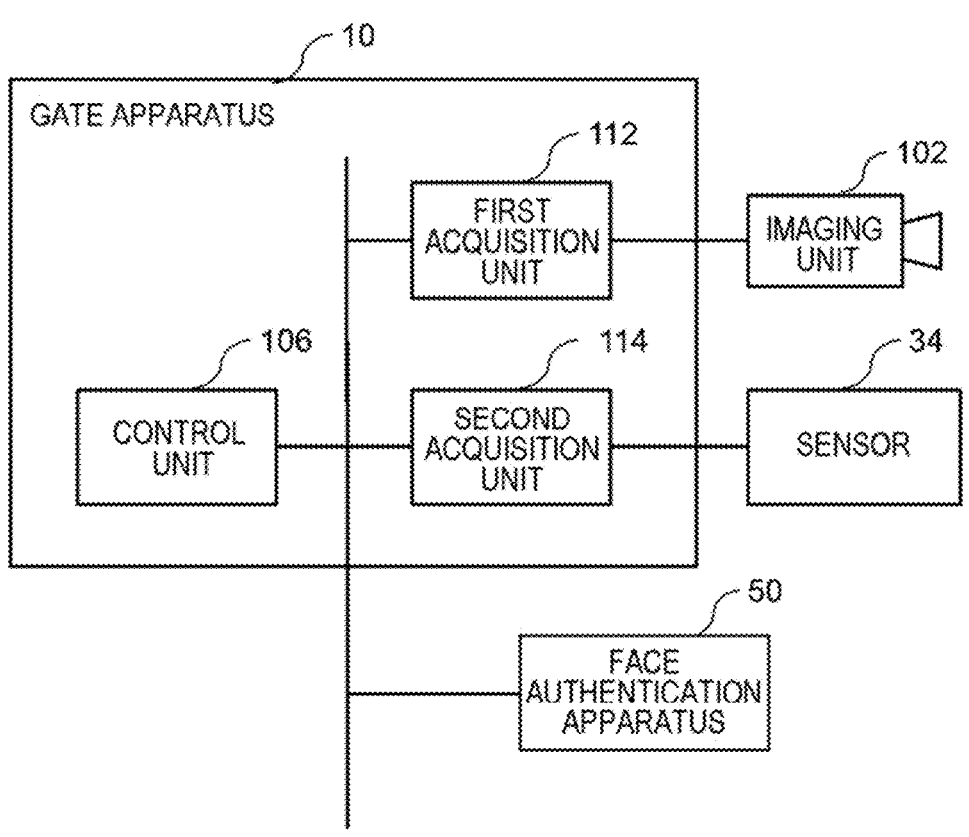
FIG. 19 illustrates a functional configuration example of the gate apparatus according to the present example embodiment.

While example embodiments have been described with reference to drawing, these are only examples and a variety of other configurations may be adopted. For example, as illustrated in FIG. 19, the gate apparatus 10 may include the control unit 106 equivalent to FIG. 4 and additionally the imaging unit 102 as well as a first acquisition unit 112 and a second acquisition unit 114 in place of the acquisition unit 104.

The first acquisition unit 112 acquires, from the imaging unit 102, an image of a person passing through the passage 12 leading to a gate. The second acquisition unit 114 acquires a detection result from the sensor 34 provided on the floor of the passage 12. The control unit 106 controls imaging timing of the imaging unit 102 by using the detection result of the sensor 34 acquired by the second acquisition unit 114.

With this configuration, the second acquisition unit 114 acquires a detection result of presence of a person from the sensor 34, and the control unit 106 controls imaging timing of the imaging unit 102 by using the detection result. Under control of imaging timing by the control unit 106, the imaging unit 102 images a person passing through the passage 12 and the resulting imaged image is acquired by the first acquisition unit 112. Timing is controlled in such a way that the control unit 106 will image an image suitable for authentication processing in the face authentication apparatus 50, so that the first acquisition unit 112 can acquire an image suitable for authentication processing from the imaging unit 102.

The image acquired by the first acquisition unit 112 is transmitted to the face authentication apparatus 50 and used for authentication processing, and similarly to the foregoing example embodiment, it is possible to perform open/close control of a gate based on an authentication result.

For example, the some non-limiting embodiments are applicable to a gate apparatus that does not include the housing 14 or the open/close flap door 16 but includes at least the imaging unit 102 and the display unit 22.

In this configuration, the imaging unit 102 images a verification target person in a place requiring identity verification. The acquisition unit 104 acquires a detection result from a detection unit (sensor 34) provided in a stepping position for a person in a place requiring identity verification, the detection unit detecting presence of a person. The control unit 106 controls imaging timing of the imaging unit 102 by using a detection result acquired by the acquisition unit 104.

The acquisition unit 104 acquires a detection result of detection of presence of a person by using the sensor 34 arranged in the same position as a guide pattern provided in a place requiring identity verification, the guide pattern indicating a route to a stepping position for a person. The imaging unit 102 is installed beside a place requiring identity verification. The control unit 106 causes the imaging unit 102 to execute imaging when not less than a predetermined ratio of sensors 34 among the sensors 34 have detected presence of a person.

While the some non-limiting embodiments have been particularly shown and described with reference to exemplary embodiments thereof, the some non-limiting embodiments are not limited to these embodiments. It will be understood by those of ordinary skill in the art that various changes in form and details may be made therein without departing from the spirit and scope of the some non-limiting embodiments as defined by the claims.

Note that when information related to a user is acquired and utilized with relation to the some non-limiting embodiments, that action shall be duly taken.

A part or a whole of the foregoing example embodiments can be described as in the following supplementary notes, but is not limited thereto.

1. A gate apparatus including:
   an imaging unit that images a person passing through a passage leading to a gate;
   an acquisition unit that acquires a detection result from a detection unit which is provided on a floor of the passage and detects presence of the person; and
   a control unit that controls imaging timing of the imaging unit by using the detection result acquired by the acquisition unit.

2. The gate apparatus according to supplementary note 1, wherein the acquisition unit acquires a detection result of detection of presence of the person by using a sensor being provided on the floor of the passage and arranged in a same position as a guide pattern indicating a route to the gate.

3. The gate apparatus according to supplementary note 2, wherein
   the imaging unit is installed beside the passage,
   the sensors are arranged at a plurality of points or in at least a partial region in the guide pattern, and
   the control unit causes the imaging unit to execute imaging when sensors exceeding a predetermined ratio among the sensors detect presence of the person.

4. A gate apparatus including:
   an imaging unit that images a verification target person in a place requiring identity verification;
   an acquisition unit that acquires a detection result from a detection unit which is provided at a stepping position for a person in the place requiring identity verification and detects presence of the person; and
   a control unit that controls imaging timing of the imaging unit by using the detection result acquired by the acquisition unit.

5. The gate apparatus according to supplementary note 4, wherein
   the acquisition unit acquires a detection result of detection of presence of the person by using a sensor being provided in the place requiring identity verification and arranged in a same position as a guide pattern indicating a route to the stepping position for a person.

6. The gate apparatus according to supplementary note 5, wherein
   the imaging unit is installed beside the place requiring identity verification,
   the sensors are arranged at a plurality of points or in at least a partial region of the guide pattern, and
   the control unit causes the imaging unit to execute imaging when sensors exceeding a predetermined ratio among the sensors detect presence of the person.

7. The gate apparatus according to any one of supplementary notes 1 to 6, further including
   an estimation unit that estimates, based on an image of the person imaged by the imaging unit, a line of sight or a face orientation of the person, wherein
   the control unit controls the imaging timing by using an estimation result by the estimation unit.

8. The gate apparatus according to any one of supplementary notes 1 to 7, further including
   an output unit that performs predetermined output when the control unit has determined that it is not appropriate timing for imaging to be executed.

9. A gate system including:
   a gate apparatus; and
   a foot mark that detects presence of a person and is provided on a floor of a passage, wherein
   the gate apparatus includes
   an imaging unit that images a person passing through the passage leading to a gate
   an acquisition unit that acquires a result of detection of the person in the passage using the foot mark, and
   a control unit that controls imaging timing of the imaging unit by using the result of the detection acquired by the acquisition unit.

10. The gate system according to supplementary note 9, wherein the acquisition unit of the gate apparatus acquires a detection result of detection of presence of the person by using a sensor being provided on the floor of the passage and arranged in a same position as a guide pattern indicating a route to the gate.

11. The gate system according to supplementary note 10, wherein the imaging unit of the gate apparatus is installed beside the passage, the sensors are arranged at a plurality of points or in at least a partial region in the guide pattern, and the control unit of the gate apparatus causes the imaging unit to execute imaging when sensors exceeding a predetermined ratio among the sensors detect presence of the person.

12. A gate system including:

a gate apparatus; and a foot mark that detects presence of a person and is provided in a place requiring identity verification, wherein the gate apparatus includes an imaging unit that images a person as a verification target in the place requiring identity verification, an acquisition unit that acquires a detection result from a detection unit which is provided at a stepping position for a person in the place requiring identity verification and detects presence of the person, and a control unit that controls imaging timing of the imaging unit by using the detection result acquired by the acquisition unit.

13. The gate system according to supplementary note 12, wherein the acquisition unit of the gate apparatus acquires a detection result of detection of presence of the person by using a sensor being provided in the place requiring identity verification and arranged in a same position as a guide pattern indicating a route to the stepping position for a person.

14. The gate system according to supplementary note 13, wherein the imaging unit of the gate apparatus is installed beside the place requiring identity verification, the sensors are arranged at a plurality of points or in at least a partial region of the guide pattern, and the control unit of the gate apparatus causes the imaging unit to execute imaging when sensors exceeding a predetermined ratio among the sensors detect presence of the person.

15. The gate system according to any one of supplementary notes 9 to 14, wherein the gate apparatus further includes an estimation unit that estimates, based on an image of the person imaged by the imaging unit, a line of sight or a face orientation of the person, and the control unit of the gate apparatus controls the imaging timing by using an estimation result by the estimation unit.

16. The gate system according to any one of supplementary notes 9 to 15, further including:

an output unit that performs predetermined output when the control unit of the gate apparatus has determined that it is not appropriate timing for imaging to be executed.

17. A control method for a gate apparatus, including:

by a gate apparatus, acquiring a detection result from a sensor, the sensor which detects, in a passage leading to a gate, presence of a person passing through the passage and is provided on a floor of the passage; and controlling, based on the detection result, imaging timing of a camera that images the person passing through the passage, in order to acquire a face image used for face authentication.

18. The control method for a gate apparatus according to supplementary note 17, further including, by the gate apparatus, acquiring a detection result of detection of presence of the person by using a sensor being provided on the floor of the passage and arranged in the a position as a guide pattern indicating a route to the gate.

19. The control method for a gate apparatus according to supplementary note 18, wherein the camera is installed beside the passage, the sensors are arranged at a plurality of points or in at least a partial region of the guide pattern, and the control method further comprises, by the gate apparatus, causing the camera to execute imaging when sensors exceeding a predetermined ratio among the sensors detect presence of the person.

20. A control method for a gate apparatus, including:

by a gate apparatus, acquiring a detection result from a sensor which is provided in a stepping position for a person in a place requiring identity verification and detects presence of the person in the place requiring identity verification; and controlling, based on the detection result, imaging timing of a camera that images a person as a verification target in the place requiring identity verification in order to acquire a face image used for face authentication.

21. The control method for a gate apparatus according to supplementary note 20, further including, by the gate apparatus, acquiring a detection result of detection of presence of the person by using a sensor being provided in the place requiring identity verification and arranged in a same position as a guide pattern indicating a route to the stepping position for a person.

22. The control method for a gate apparatus according to supplementary note 21, wherein the camera is installed beside the place requiring identity verification, the sensors are arranged at a plurality of points or in at least a partial region of the guide pattern, and the control method further comprises, by the gate apparatus, causing the camera to execute imaging when sensors exceeding a predetermined ratio among the sensors detect presence of the person.

23. The control method for a gate apparatus according to any one of supplementary notes 17 to 22, further including:

by the gate apparatus, estimating, based on an image of the person imaged by the camera, a line of sight or a face orientation of the person; and controlling the imaging timing by using an estimation result.

24. The control method for a gate apparatus according to any one of supplementary notes 17 to 23, further including, by the gate apparatus, performing predetermined output when having determined that it is not appropriate timing for imaging to be executed.

25. A program for causing a computer to execute:

a procedure for detecting presence of a person detected by using a sensor which is provided on a floor of a passage leading to a gate; and a procedure for controlling, based on a detection result, imaging timing of a camera that images the person passing through the passage in order to acquire a face image used for face authentication.

26. The program according to supplementary note 25 for further causing a computer to execute a procedure for acquiring a detection result of detection of presence of the person by using a sensor being provided on a floor of the passage and arranged in a same position as a guide pattern indicating a route to the gate.

27. The program according to supplementary note 26, wherein the camera is installed beside the passage, the sensors are arranged at a plurality of points or in at least a partial region of the guide pattern, and the program for further causing a computer to execute a procedure for causing the camera to execute imaging when sensors exceeding a predetermined ratio among the sensors detect presence of the person.

28. A program for causing a computer to execute:

a procedure for acquiring a detection result from a sensor being provided at a stepping position for a person in a place requiring identity verification and detecting presence of the person in the place requiring identity verification; and a procedure for controlling, based on the detection result, imaging timing of a camera that images a person as a verification target in the place requiring identity verification in order to acquire a face image used for face authentication.

29. The program according to supplementary note 28 for further causing a computer to execute a procedure for acquiring a detection result of detection of presence of the person by using a sensor being provided in the place requiring identity verification and arranged in a same position as a guide pattern indicating a route to the stepping position for a person.

30. The program according to supplementary note 29, wherein the camera is installed beside the place requiring identity verification, the sensors are arranged at a plurality of points or in at least a partial region of the guide pattern, and the program for further causing a computer to execute a procedure for causing the camera to execute imaging when sensors exceeding a predetermined ratio among the sensors detect presence of the person.

31. The program according to any one of supplementary notes 25 to 30 for further causing a computer to execute:

a procedure for estimating, based on an image of the person imaged by the camera, a line of sight or a face orientation of the person; and a procedure for controlling the imaging timing by using an estimation result in the estimating procedure.

32. The program according to any one of supplementary notes 25 to 31 for further causing a computer to execute a procedure for performing predetermined output when it is determined that it is not appropriate timing for imaging to be executed.

33. A gate apparatus including:

a first acquisition unit that acquires, from an imaging unit, an image imaging a person passing through a passage leading to a gate;

a second acquisition unit that acquires a detection result from a detection unit which is provided on a floor of the passage and detects presence of the person; and a control unit that controls imaging timing of the imaging unit by using the detection result acquired by the second acquisition unit.

34. A control method for a gate apparatus, including:

by a gate apparatus, acquiring a detection result from a detection unit which is provided on a floor of a passage and detects presence of a person passing through the passage leading to a gate;

controlling, by using the acquired detection result, imaging timing of an imaging unit for imaging a person passing through a passage leading to a gate; and acquiring an image in which the person is imaged with the imaging timing from the imaging unit.

35. A program for causing a computer to execute:

a procedure for acquiring a detection result from a detection unit which is provided on a floor of a passage and detects presence of a person passing through the passage leading to a gate;

a procedure for controlling, by using the acquired detection result, imaging timing of an imaging unit for imaging a person passing through a passage leading to a gate; and a procedure for acquiring an image imaging the person with the imaging timing from the imaging unit.

REFERENCE SIGNS LIST

1 Gate system
3 Communication network
10 Gate apparatus
12 Passage
12*b* Exit
14 Housing
14*a*, 14*b* One end surface
16 Open/Close flap door
16*a*, 16*b* One end surface
18 Entry sensor
20 Camera unit
22 Display unit
30 Guide pattern
32 Foot mark region
34 Sensor
40 Stepping position
50 Face authentication apparatus
102 Imaging unit
104 Acquisition unit
106 Control unit
108 Estimation unit
110 Output unit
112 First acquisition unit
114 Second acquisition unit

21

1000 Computer
1010 Bus
1020 Processor
1030 Memory
1040 Storage device
1050 Input/Output interface
1060 Network interface

The invention claimed is:

1. A gate apparatus comprising:
at least one memory configured to store instructions; and
at least one processor configured to execute the instructions to:
image a person passing through a passage leading to a gate;
by using at least one sensor provided on a floor of the passage and arranged in a same position as a guide pattern indicating a route to the gate, for each of a plurality of regions into which the guide pattern has been divided and that are parallel to a travel direction, obtain a ratio of a number of the sensors in the region that are outputting an ON signal to a total number of the sensors in the region; and
in a case when the regions in which the ratio is equal to or more than a threshold are in succession with respect to the travel direction, execute imaging from a side of the passage.

2. The gate apparatus according to claim 1, wherein the at least one processor is further configured to execute the instructions to
perform predetermined output when having determined that there is not appropriate timing for imaging to be executed.

3. The gate apparatus according to claim 1, wherein the guide pattern has a shape of a footprint.

4. A gate system comprising:
a gate apparatus; and

22 a guide pattern indicating a route to a stepping position for a person in a place requiring identity verification, the guide pattern including a foot mark region;
at least one sensor provided on a floor of the passage and arranged in a same position as a guide pattern indicating a route to the gate, wherein
the gate apparatus includes
at least one memory configured to store instructions, and
at least one processor configured to execute the instructions to:
image a person as a verification target in the place requiring identity verification;
for each of a plurality of regions into which the guide pattern has been divided and that are parallel to a travel direction, obtain a ratio of a number of the sensors in the region that are outputting an ON signal to a total number of the sensors in the region, by using the at least one sensor; and
in a case when the regions in which the ratio is equal to or more than a threshold are in succession with respect to the travel direction, execute imaging from a side of the place requiring identity verification.

5. A control method for a gate apparatus comprising:
by a gate apparatus,
by using at least one sensor provided on a floor of a passage and arranged in a same position as a guide pattern indicating a route to a gate, for each of a plurality of regions into which the guide pattern has been divided and that are parallel to a travel direction, obtain a ratio of a number of the sensors in the region that are outputting an ON signal to a total number of the sensors in the region; and
in a case when the regions in which the ratio is equal to or more than a threshold are in succession with respect to the travel direction, executing imaging a person passing through the passage leading to the gate from a side of the passage.

* * * * *